United States Patent [19]
Fielding et al.

[11] Patent Number: 6,012,084
[45] Date of Patent: Jan. 4, 2000

[54] VIRTUAL NETWORK COMMUNICATION SERVICES UTILIZING INTERNODE MESSAGE DELIVERY TASK MECHANISMS

[75] Inventors: William S. Fielding; Christopher R. Plater, both of Vancouver, Canada

[73] Assignee: International Business Machines Corporation, Armonk, N.Y.

[21] Appl. No.: 08/904,939

[22] Filed: Aug. 1, 1997

[51] Int. Cl.[7] ..................................................... G06F 15/16
[52] U.S. Cl. ........................... 709/205; 709/238; 709/300
[58] Field of Search ........................ 395/200.68, 200.69, 395/200.72, 800; 371/32; 709/200, 202, 204, 205, 207, 228, 230, 238, 243, 300, 302, 304

[56] References Cited

U.S. PATENT DOCUMENTS

| | | | |
|---|---|---|---|
| 5,524,253 | 6/1996 | Pham | 395/800 |
| 5,875,301 | 7/1997 | Duckwall | 395/200.51 |
| 5,878,056 | 5/1997 | Black | 371/32 |

*Primary Examiner*—Dung C. Dinh
*Attorney, Agent, or Firm*—Kenneth A. Seaman

[57] ABSTRACT

A networking services architecture is provided in which several communication media and protocols are supported. In commonly used communications middleware, the routing specification and messaging interface provided to a client application may depend on the communications protocol used. The client's interface is independent of the communication protocols supported for internode message delivery, and the routing specification is also independent of the number and type of communication protocols supported. For instance in a communication system, node A and node B could be connected using IP (Internet Protocol), while node B and node C could be connected using synchronous pooling. The routing specification is independent of these details since nodes are identified in a protocol independent manner.

21 Claims, 13 Drawing Sheets

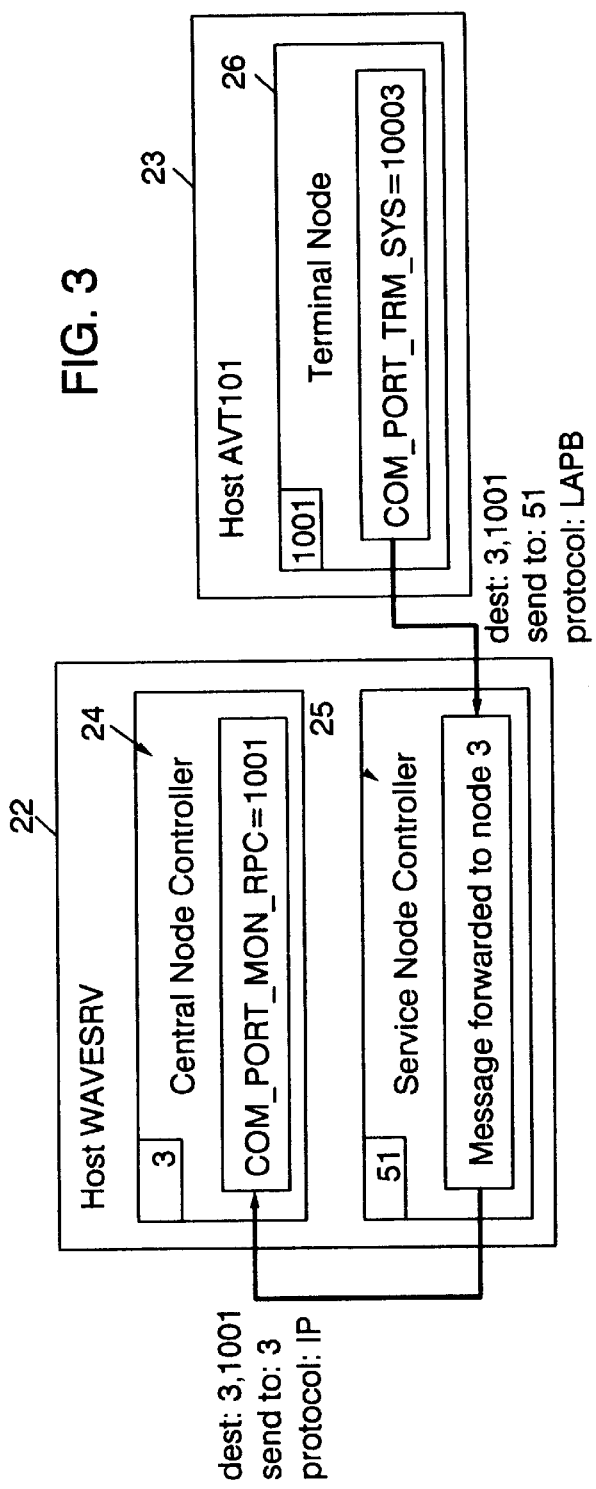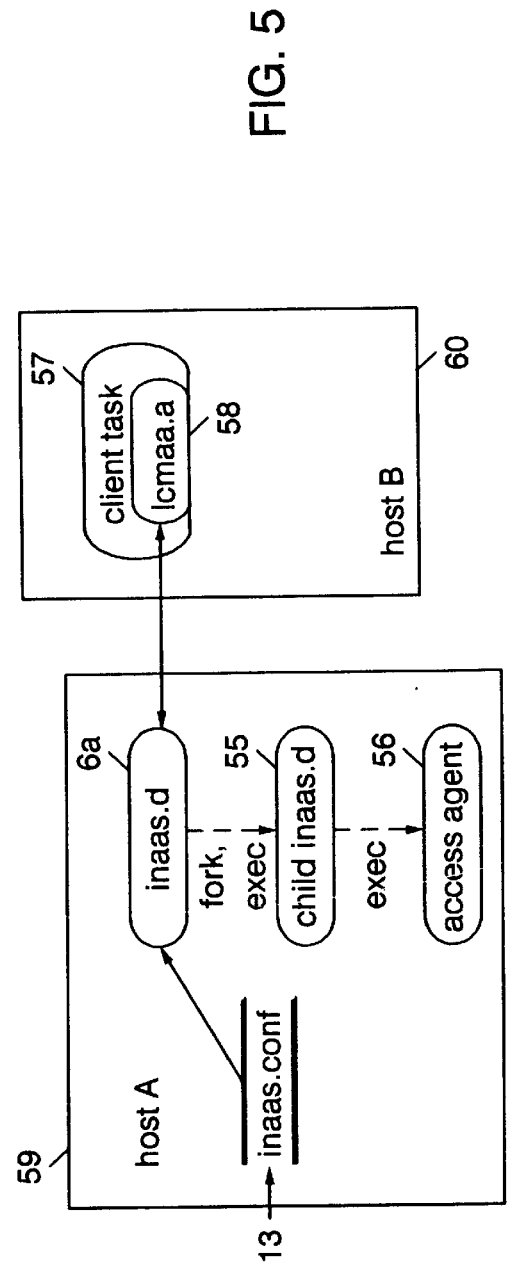

```
tsk_openTask()
/* user initialization code */
tsk_openPort()
tsk_setBlockingPort()
tsk_installCallBack(userCallback1,...)
tsk_installCallBack(userCallback2,...)
• • •
tsk_startProcessingEvents()                    userCallback1()
                                                    tsk_exit()
                              userCallback2()
```

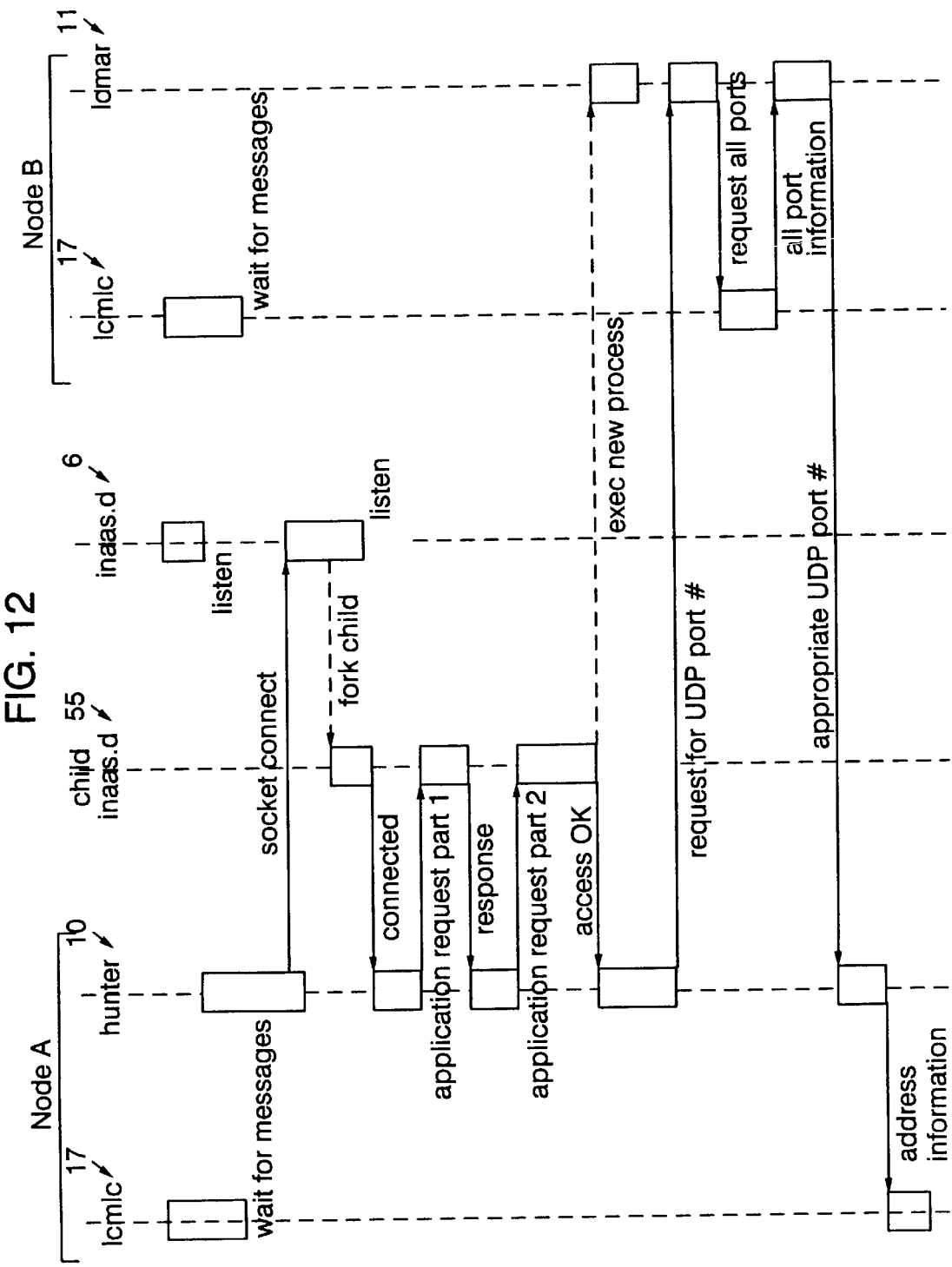

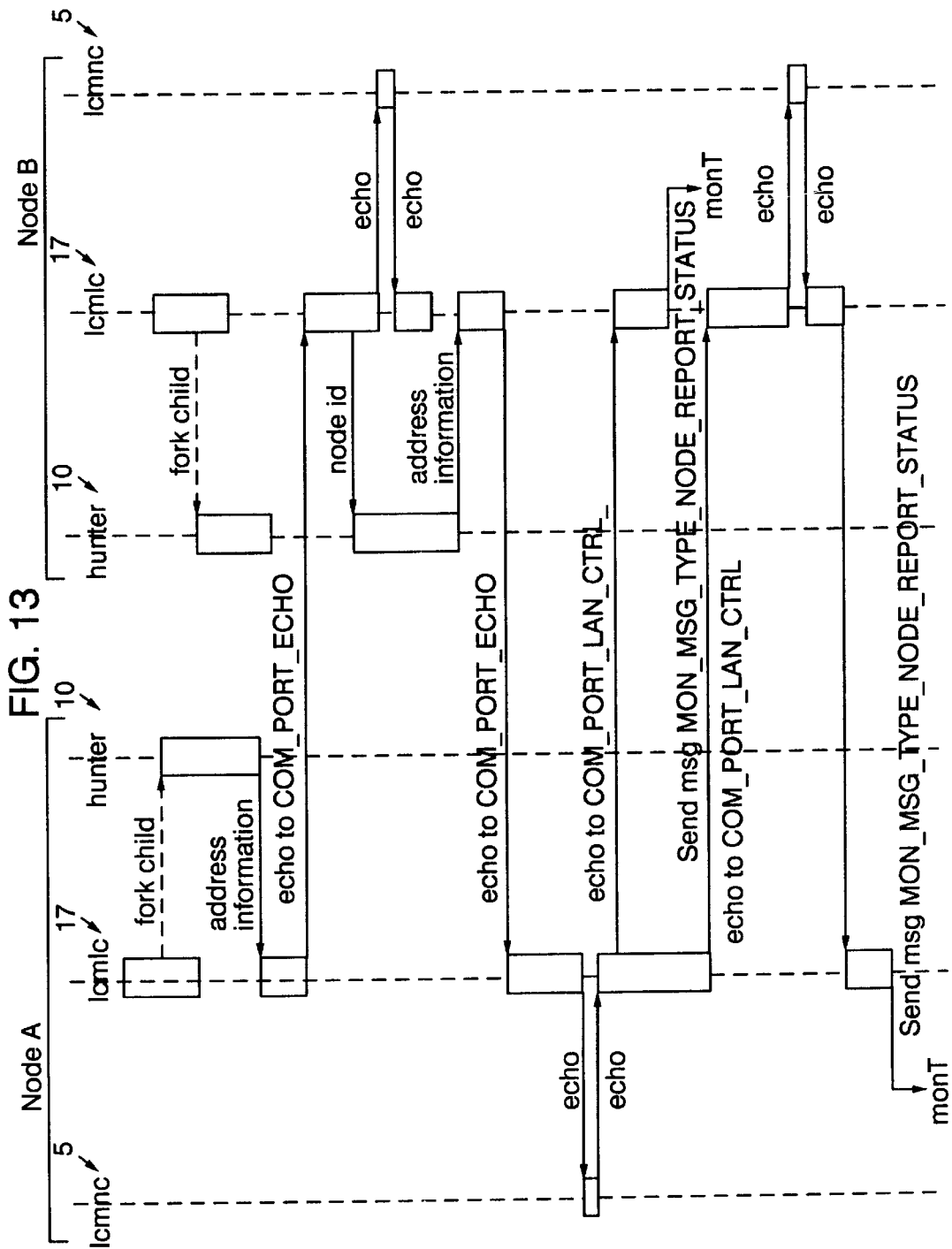

VIRTUAL NETWORK COMMUNICATION SERVICES UTILIZING INTERNODE MESSAGE DELIVERY TASK MECHANISMS

CROSS REFERENCES TO RELATED PATENT APPLICATIONS

The following patent applications:

| S/N | Totle | IBM Docket No. |
|---|---|---|
| 08/904,813 | Multiplexer for Multiple Media Streams | CA 97 025a |
| 08/904,773 | Method and Apparatus for Controlling Elementary Stream Data Flow | CA 97 025b |
| 08/904,819 | Frame Buffer for Multimedia Terminal | CA 97 026 |
| 08/904,778 | Isolation of Multimedia Signals for Transmission and Processing Within a Multimedia Terminal | CA 97 027 |
| 08/905,197 | Internet Application Access Server Apparatus and Method | CA 97 031 |
| 08/904,774 | Method and Apparatus for Maintaining Directory Services for a Video Transmission Network | CA 97 035 |
| 08/904,776 | Method and Apparatus for Controlling Access in a Video Distribution Network | CA 97 036 |
| 08/904,775 | Method and Apparatus for Controlling Network Switches | CA 97 036 |
| 08/904,872 | Method and Apparatus for Controlling a Mixed Network of Analog and Digital Switches | CA 97 038 | are related to this patent application and are incorporated herein by reference.

1 NETWORK COMMUNICATION SERVICES METHOD AND APPARATUS

1.1 Field of the Invention

The present invention relates to an architecture for network communication services with special applicability to networks capable of providing message routing and delivery over multiple communication protocols on distributed networks.

1.2 Background of the Invention

Information processing networks have dramatically increased in size, and complexity especially with the increased volume of use and the increased complexity of communications and data processing that are done on the networks. One of the more complex areas which are rapidly expanding are the telecommunications networks which now are opening up into the videoconferencing arena. In this and other information processing networks there are several communication protocols and media in use. When networks having particular protocols or organizations are interconnected with other networks having different protocols or organizations there may be difficulties or complexity in passing messages between them or conducting distributed application processing.

In the data processing field and in the video conferencing field distributed applications that are used may make use of one or more communication media and protocols to allow distributed nodes to communicate. The nodes of a distributed network may route messages for other nodes. For instance, consider the case of three nodes; A, B, and C where node A can talk directly to node B, and node B can talk directly to node C; but node A cannot talk directly to node C. Messages from A to C could be delivered to B and routed from B to C.

As the number of nodes and complexity of networks increases other complications occur. For instance in a network of nodes consisting of hundreds or thousands of nodes the failure of a node or the network may impose significant difficulties in restarting the network and the nodes. It is understood that depending on the network restarting the network may require that nodes of the network may need to be started in a particular order. In other networks the failure of a node may not be readily detectable by the network such that certainty of communication may be affected.

If an information processing network is constructed using the Internet as a base it will be appreciated that the size of the network may become immense. It would be unfortunate if the unavailability of any portion of the Internet would cause the information processing network to be brought down, and particularly if it could not be rapidly restarted.

It would be preferable that the network could include a method or apparatus for verifying its integrity and restarting nodes that have stopped without requiring a network shut-down and full restart.

SUMMARY OF THE INVENTION

In one implementation of the current invention a networking services architecture is provided in which several communication media and protocols are supported. In commonly used communications middleware, the routing specification and messaging interface provided to a client application may depend on the communications protocol used. In the present invention the client's interface is independent of the communication protocols supported for internode message delivery, and the routing specification is also independent of the number and type of communication protocols supported. For instance, in a communications system constructed in accordance with a preferred mode of the invention, for the example mentioned above, node A and node B could be connected using IP (Internet Protocol), while node B and node C could be connected using synchronous polling. The routing specification is independent of these details, since nodes are identified in a protocol independent manner.

One aspect of the invention provides a network communication services system for providing communication services between nodes of a network.

Local communications access means (such as the module comprising lcmnc taks plus lcmai library in the preferred embodiment below) for each node adapted to forward a message from a task on a node internally to another task on the node; configuration information means containing information on nodes with which communication is possible;

One or more internode message delivery task means on a first node adapted to forward a message addressed to a second node from the local communications access means on the first node to the second node to internode message delivery task means on the second node and to accept messages from an internode message delivery task means of a remote node for routing as appropriate to:
(i) local communications access means if intended for internal use within a node
(ii) internode message delivery task means of the remote node.

A further aspect of the invention provides:
monitoring means for monitoring communications link between nodes including: the internode message delivery task means including status monitoring task means for communications connection to other nodes;
the status monitoring task means including polling task means for polling the other nodes to determine their status; and reporting means for reporting a detected change in satus of the other nodes;

the status monitoring task means being adapted to: store status information in a database; for registration of tasks;

notify tasks registered with it of changes in communication link status of selected nodes.

Still another aspect of the invention provides a system wherein the monitoring means (monT) includes:

means for answering queries from other tasks for node status of a remote node;

means for notifying tasks asynchronously of node status;

means for registering with monitoring means on a node that is directly connected to another node that provides communications routing for the other node, in order to determine communication link status of a node that it has a route to and also to any node to which it is directly connected.

Another aspect of the invention provides a system as above including a task manager (TMGT) at a node adapted to monitor applications within the node and including:

means to start a task on the node;

means to monitor the task;

means to restart the task if required;

means to terminate the task;

means to report changes of status of the node to the monitoring means.

A further aspect of the invention provides network communication services system for providing communication services between nodes of a network comprising: a plurality of nodes.

Each the nodes comprising:

local communications access means for each node adapted to forward a message from a task on a node internally to another task on the node;

configuration information means containing information on nodes with which communication is possible;

One or more internode message delivery task means on a first node adapted to forward a message addressed to second node from the local communications access means on the first node to the second node to internode message delivery task means on the second node and to accept messages from an internode message delivery task means of a remote node for routing as appropriate to:

(i) local communications access means if intended for internal use within a node (ii) internode message delivery task means of the remote node.

Advantageously monitoring means may be provided in another aspect of the invention for monitoring communications link between nodes including:

the internode message delivery task means including status monitoring task means for communications connection to other nodes;

the status monitoring task means including polling task means for polling the other nodes to determine their status; and reporting means for reporting a detected change in satus of the other nodes;

The status monitoring task means being adapted to:

store status information in a database;

for registration of tasks;

notify tasks registered with it of changes in communication link status of selected nodes.

The monitoring means (monT) may include:

means for answering queries from other tasks for node status of a remote node;

means for notifying tasks asynchronously of node status;

means for registering with monitoring means on a node that is directly connected to another node that provides communications routing for the other node, in order to determine communication link status of a node that it has a route to and also to any node to which it is directly connected.

Another aspect can provide a task manager (TMGT) at a node adapted to monitor applications within the node and including:

means to start a task on the node;

means to monitor the task;

means to restart the task if required;

means to terminate the task;

means to report changes of status of the node to the monitoring means.

Advantageously, the network communication services system invention can provide communication services between nodes of a network for providing both message delivery and Remote Procedure Call services between nodes of a network comprising:

a plurality of nodes;

the nodes comprising:

local communications access means for each node adapted to forward a message from a task on a node internally to another task on the node;

configuration information means containing information on nodes with which communication is possible.

One or more internode message delivery task means on a first node adapted to forward a message addressed to second node from the local communications access means on the first node to the second node to internode message delivery task means on the second node and to accept messages from an internode message delivery task means of a remote node for routing as appropriate to:

(i) local communications access means if intended for internal use within a node;

(ii) internode message delivery task means of the remote node; wherein the internode message delivery task means on at least the first node is adapted to communicate in a plurality of data communication protocols including at least one of. IP (Internet Protocol), LAPB, or BISYNC 3270.

Still another embodiment of the invention provides a method for use in a network communication services system for providing communication services between nodes of the network comprising:

for the nodes;

forwarding a message from a task on a node internally to another task on the node using local communications access means on each node;

storing information on nodes with which communication is possible within configuration information means within the nodes;

Forwarding a message using one or more internode message delivery task means on a first node to forward a message addressed to a second node from the local communications access means on the first node to the second node to internode message delivery task means on the second node and using internode message delivery task means to accept messages from an internode message delivery task means of a remote node for routing as appropriate to:

(i) local communications access means if intended for internal use within a node (ii) internode message delivery task means of the remote node.

Advantageously, the method can further include: monitoring communications link between nodes using monitoring means wherein the monitoring includes:

monitoring status of nodes with which communications connections are required using status monitoring task means for communications connection to other nodes;

polling the other nodes using polling task means for polling the other nodes to determine their status; and reporting a detected change in satus of the other nodes using reporting means;

The status monitoring task means being adapted to:

store status information in a database;

register of tasks;

notify tasks registered with it of changes in communication link status of selected nodes.

The monitoring may also include:

answering queries from other tasks for node status of a remote node;

notifying tasks asynchronously of node status;

registering with monitoring means on a node that is directly connected to another node that providing communications routing for the other node, in order to determine communication link status of a node that it has a route to and also to any node to which it is directly connected.

Another aspect of the method of the invention can include monitoring applications within the node and including the capability of:

starting a task on the node;

monitoring the task;

restarting the task if required;

terminating the task if required;

reporting changes of status of the node in monitoring.

Still another aspect of the invention provides a computer program product comprising:

a computer usable medium having computer readable program code means embodied therein for implementing a network communication services system for providing communication services between nodes of a network comprising a plurality of nodes;

the computer readable program code means in the computer program product comprising:

computer readable program code means for causing a computer to effect, local communications access means for each node adapted to forward a message from a task on a node internally to another task on the node;

computer readable program code means for causing a computer to effect, configuration information means containing information on nodes with which communication is possible;

computer readable program code means for causing a computer to effect, one or more internode message delivery task means on a first node adapted to forward a message addressed to a second node from the local communications access means on the first node to the second node to internode message delivery task means on the second node and to accept messages from an internode message delivery task means of a remote node for routing as appropriate to:

(i) local communications access means if intended for internal use within a node (ii) internode message delivery task means of the remote node.

The computer program product may further include: computer readable program code means for causing a computer to effect, monitoring means for monitoring communications link between nodes including:

the internode message delivery task means including status monitoring task means for communications connection to other nodes;

the status monitoring task means including polling task means for polling the other nodes to determine their status; and reporting means for reporting a detected change in satus of the other nodes;

the status monitoring task means being adapted to:

store status information in a database;

for registration of tasks notify tasks registered with it of changes in communication link status of selected nodes.

In addition the the computer program product can include program code means for causing a computer to effect monitoring means (monT) includes:

means for answering queries from other tasks for node status of a remote node;

means for notifying tasks asynchronously of node status;

means for registering with monitoring means on a node that is directly connected to another node that provides communications routing for the other node, in order to determine communication link status of a node that it has a route to and also to any node to which it is directly connected.

The computer program product embodiment of the invention can include program code means for causing a computer to effect, task manager means (TMGT) at a node adapted to monitor applications within the node and including computer readable program code means for causing a computer to effect:

means to start a task on the node;

means to monitor the task;

means to restart the task if required;

means to terminate the task;

means to report changes of status of the node to the monitoring means.

A further aspect of the invention provides a program storage device readable by a machine, tangibly embodying a program of instructions executable by the machine to perform method steps for use in a network communication services system for providing communication services between nodes of the network comprising:

for the nodes;

the method steps of:

forwarding a message from a task on a node internally to another task on the node using local communications access means on each node;

storing information on nodes with which communication is possible within configuration information means within the nodes;

forwarding a message using one or more internode message delivery task means on a first node to forward a message addressed to a second node from the local communications access means on the first node to the second node to internode message delivery task means on the second node and using internode message delivery task means to accept messages from an internode message delivery task means of a remote node for routing as appropriate to:

(i) local communications access means if intended for internal use within a node (ii) internode message delivery task means of the remote node.

The program storage device may further comprise a program of instructions to perform the method steps of: monitoring communications link between nodes using monitoring means wherein the monitoring includes:

monitoring status of nodes with which communications connections are required using status monitoring task means for communications connection to other nodes;

polling the other nodes using polling task means for polling the other nodes to determine their status; and reporting a detected change in satus of the other nodes using reporting means;

the status monitoring task means being adapted to:
store status information in a database;
register of tasks;
notify tasks registered with it of changes in communication link status of selected nodes.

The program storage device may further comprise a program of instructions to perform the method steps of monitoring including:

answering queries from other tasks for node status of a remote node;

notifying tasks asynchronously of node status;

registering with monitoring means on a node that is directly connected to another node that providing communications routing for the other node, in order to determine communication link status of a node that it has a route to and also to any node to which it is directly connected.

The program storage device may also further comprise a program of instructions to perform the method steps of monitoring applications within the node and including the capability of:

starting a task on the node;
monitoring the task;
restarting the task if required;
terminating the task if required;
reporting changes of status of the node in monitoring.

BRIEF DESCRIPTION OF THE DRAWINGS

The present invention will be more fully understood by reference to the following detailed description, which should be reviewed with the accompanying drawings in which:

FIG. 3 depicts a Network with three nodes;

FIG. 5 depicts an Application Access Process;

FIG. 6 depicts an Application Access Module Block Diagram;

FIG. 12 depicts Application Access (a typical sequence of events that occur when an application is accessed using Application Access component);

FIG. 13 depicts two nodes establishing communications over IP;

2 DETAILED DESCRIPTION OF THE INVENTION

2.1 Introduction

The specific embodiment of the communications system described herein has two main attributes: to provide communications services between network connected entities, and to provide a framework to facilitate rapid and convenient development of programs, called tasks that can take advantage of its capabilities. The network connected entities are called nodes, and together these nodes create a virtual network built on top of one or more underlying networks, where the underlying networks can use a multitude of network protocols, including Internet Protocol (IP), Bisync 3270, and LAPB among others. The nodes can run on a heterogenous set of hardware platforms, including SCO UNIX on PC computers, SUN computers running SUN OS, and proprietary hardware/operating system platforms.

Figure 1:
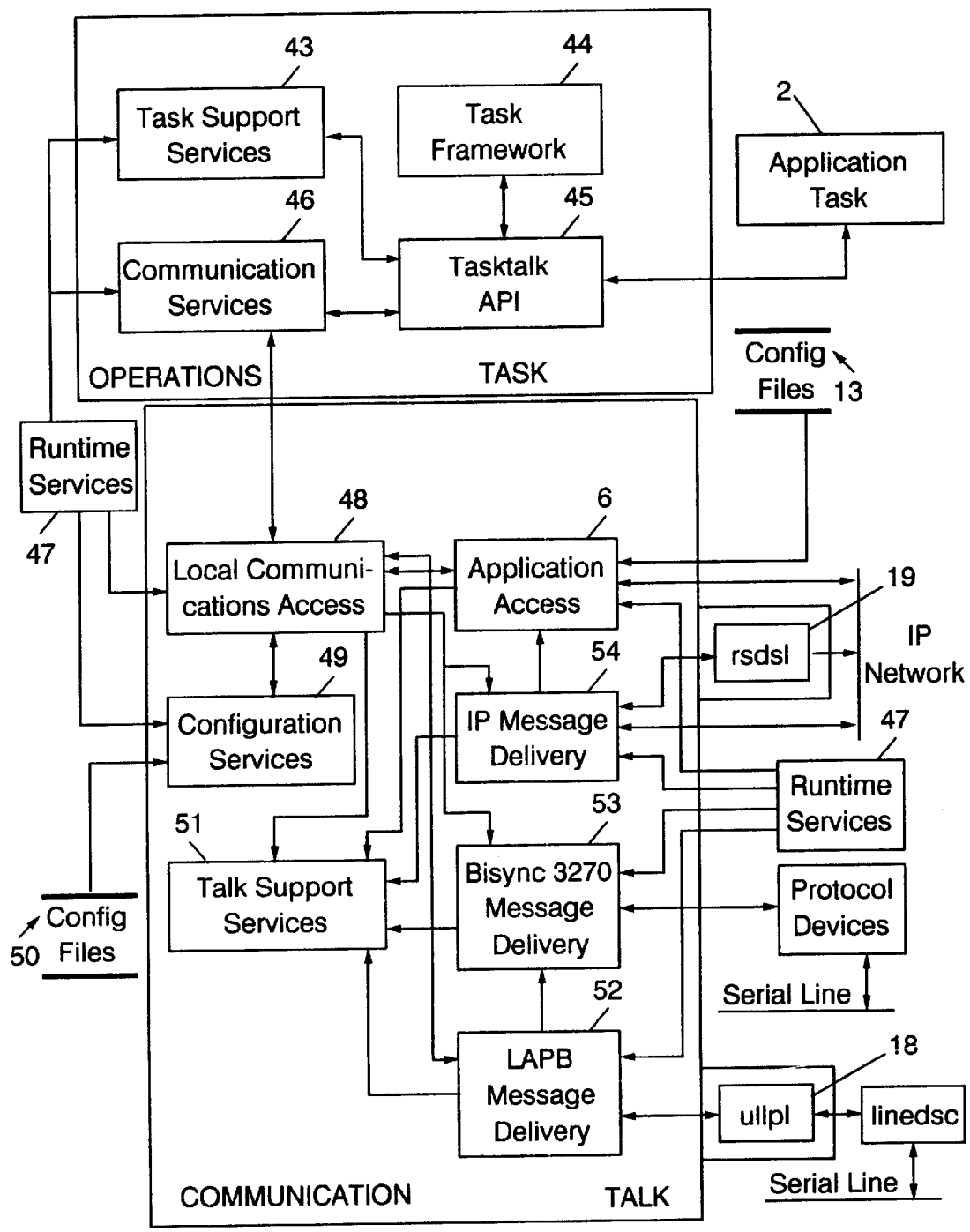
FIG. 1 depicts a System Component Diagram.
Figure 2:
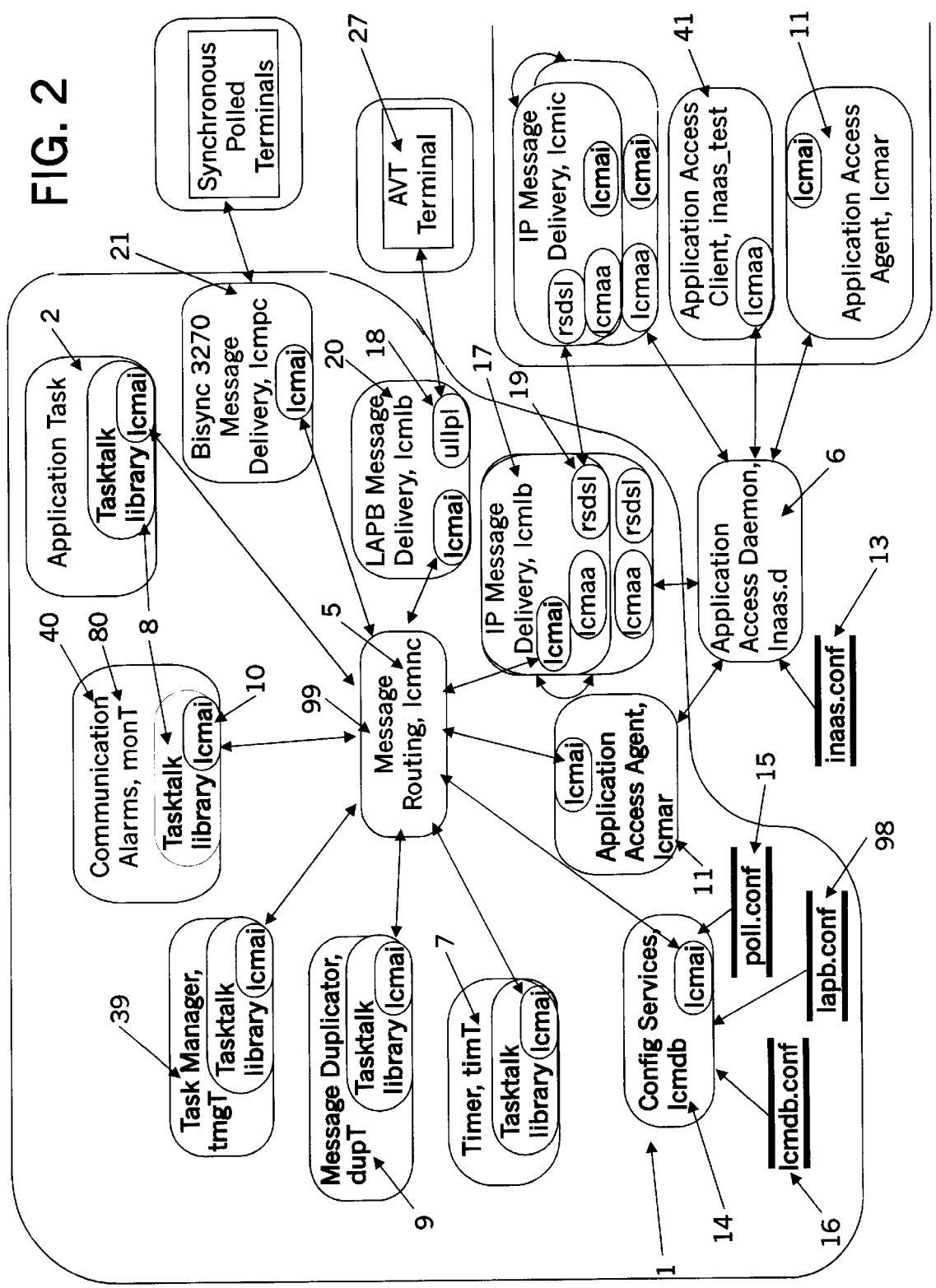
FIG. 2 depicts a System Process Diagram (shaded areas represent separate nodes)

Referring to FIG. 2, each node 1 includes a collection of tasks, some application tasks 2, and some support tasks. The support tasks shown in FIG. 6 and discussed below, together with the Tasktalk library provide services to application tasks. The provisioning of these services are broken into two layers: Operations 4 and Communication 3. The Communication layer provides basic communications services and is not visible to clients of the system of the invention. The Operations layer provides value added access to Communication services and also provides a framework to simplify application task development. The mapping (i.e. relationship) of system components shown in FIG. 1 to system tasks, libraries, daemon processes and configuration files shown in FIG. 2—2 is given in the following table:

TABLE 2-1

System Component to Process Entities Mapping

| System Component | Process Entities |
| --- | --- |
| Operations Framework 44 | Tasktalk Library 8 |
| Operations Support Services 43 | Tasktalk Library, timT task 7 |
| Communication Services 46 | Tasktalk Library, dupT task 9, monT task, tmgT task |
| System API | Tasktalk Library |
| Local Communication Access 48 | lcmai Library 10, lcmnc Task |
| Application Access 6 | inaas.d daemon process 6, lcmar access agent 11, lcmaa Library 12, inaas.conf configuration file 13 |
| Configuration Services 49 | lcmdb task 14; poll.conf 15, lcmdb.conf 16 and poll.conf 15 configuration files |
| IP Message Delivery 54 | lcmlc task 17 |
| Bisync 3270 Message Delivery 53 | lcmpc task 21 |
| LAPB Message Delivery 52 | lcmlb.task 20 |

TABLE 2-1-continued

System Component to Process Entities Mapping

| System Component | Process Entities |
|---|---|
| Talk Support Services 51 | lcmai Library 10 |
| rsdsl 19 | rsdsl Library 19 |
| ullpl 18 | ullpl Library 18 |

The Communication layer 3 provides intra and inter node message routing and delivery over multiple communication protocols. The Communication architecture isolates message routing (including indirect routing from one node through another to a third node) and intra node delivery into a single router task (lcmnc 5), while inter node messaging functions are also localized to single tasks (one for each supported network protocol). All of these tasks require network configuration information; this information is advantageously parsed by a single task (including asynchronous update notifications), and forwarded in small chunks to allow the other tasks to avoid lengthy delays in their main service provision.

Application access functionality provides an API for discovering transient or additional configuration information from other nodes in a consistent manner. Finally the Communication layer also provides a communication link and other status alarm notifications to the Operations layer for use by application tasks.

Access to Operations layer functionality from application tasks is through the system (TaskTalk) API. Requests (API function calls) are delegated to components within Operations. Information flows between Operations (Communications Services) and Operations (Local Communications Access) through the interface defined in talk.h. Some services provided by Operations require support tasks to be running (those that interface with Runtime Services 47 which start these tasks), while others do not.

Communication components interact with each other through the System API. There are task components that add value to operating system services, and the Communication Local Communications Access 48 services. There is also the Task Framework 44 component whose function is to provide a ready made skeleton for application tasks.

2.2.a The Communications Model

The communications model is that of a flat network of nodes which may reside on any of a number of separate hosts connected via multiple communications protocols. The term flat network is meant to imply there is no centralized network control, or hierarchy of network nodes. Each node has a separate "view" of the network specified in automatically generated and distributed configuration files, and can only communicate with those other nodes specifically identified therein. Executable tasks (that provide application or support services) on a given node (either local or remote) are addressed using the abstraction of communication "ports". Each task can listen or send messages on one or more ports, which must be specifically initialized. Tasks sending messages to ports on other nodes do not need to know routing or protocol information to do so, these details are hidden within the OPERATIONS 4 (TALK) layer.

From an application task's perspective, tasks or services are addressed using a TSK_ADDR (task address) structure, which includes the following: a network id, node id and port id which are all integers, and additionally a node type and port type may be specified (both from enumerated lists). See FIG. 3 for an example network with three nodes (two [24, 25] running on one host [22] and one [26] on another [23]).

Note that although the message sent from (node, port)= (1001, 10003) to (3,1001) is routed through node 51 and travels over two different communication protocols (IP and LAPB), the task that sent the message needed only to identify the destination node and port (it did not need to know any of the routing or protocol parameters). In the preferred embodiment, message sending and receiving uses a connectionless paradigm.

For more detail on the handling of messages by the various support tasks of the system of the present invention, see the section EVENT SEQUENCES, and to the event sequence RPC client and server transaction in particular, below.

Figure 4:
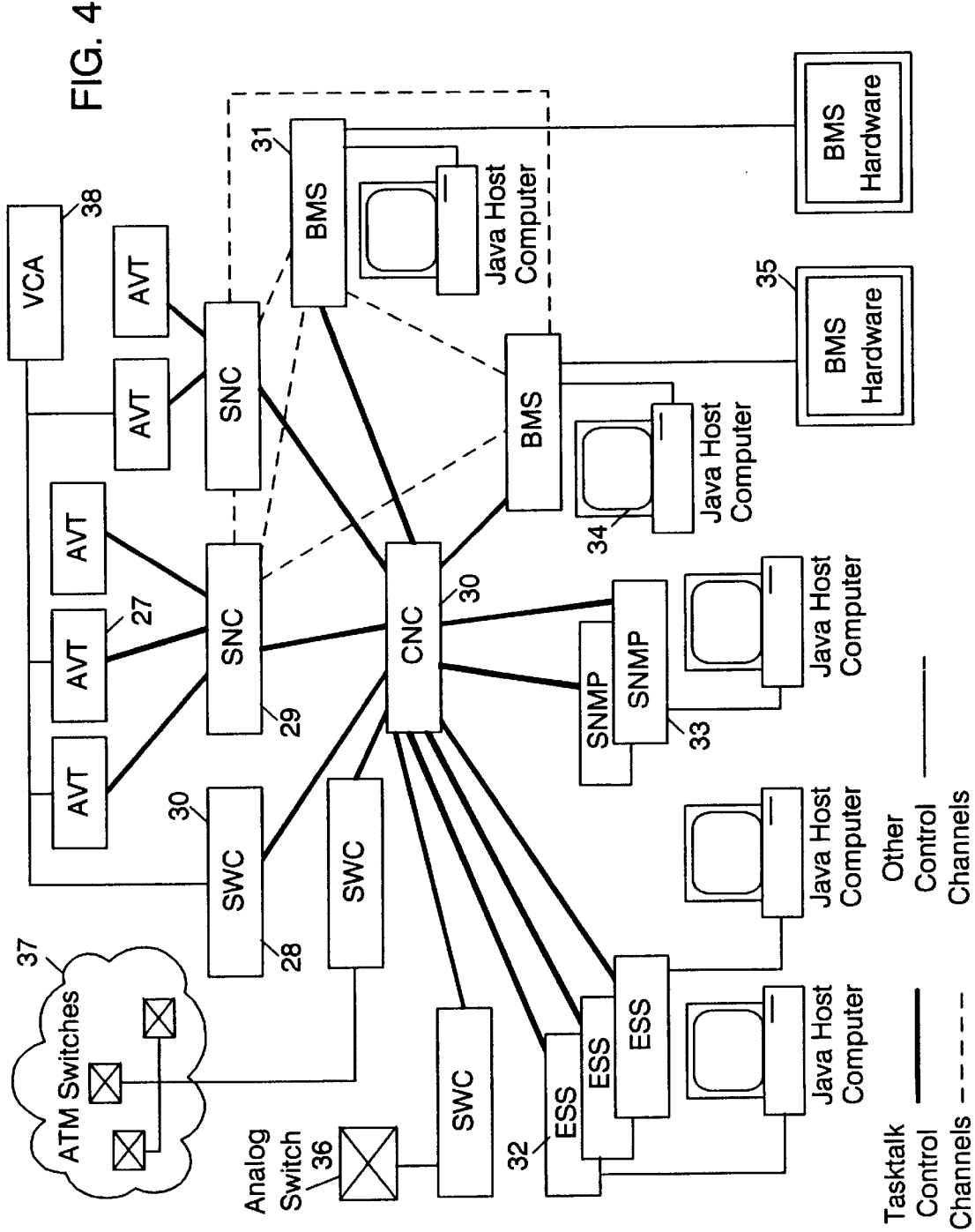
FIG. 4 depicts a Control Channel System Block Diagram.

FIG. 4 shows an example of a network in accordance with this invention as used for the control network in a Broadband Video Conferencing System. The boxes labeled CNC 30 (Central Node Controller), SNC 29 (Service Node Controllers), SWC 28 (Switch Controller), BMS 31 and 35 (Broadband Multi Site Server), ESS 32 (Event Schedules System), SNMP 33 (Simple Network Management Protocol), and AVT 27 (Audio Video Terminal) are nodes. Note that multiple nodes of a network constructed in accordance with the invention (sometimes referred to as a Tasktalk network) can be put on a single Internet host, and each node is assigned its own user account for all its application processes to run in. Connections between nodes are established by the Application Access component of the invention. In this capacity, Application Access may establish a connection between two nodes that are up and running, or it may start a node at the request of another node. In fact, an entire network using the system of the invention that is down (all nodes down) can be started by starting any single node, and all nodes will be started as each node attempts to establish a communications connection with its neighbors.

2.3 Operations Components Overview

The interface to the three Operations components is provided by the Tasktalk API 45 shown in FIG. 1. A task must link in the Tasktalk library to have access to this API.

2.3.1 Task Frame Work

The Operations Framework is responsible for making it simpler and faster to build executable tasks using the system of the invention (Tasktalk) by providing implementation for common task activities, including: startup, argument processing, generic signal and error condition handling, task shutdown, etc. This framework also forces most tasks to be similarly structured, making them more consistent and thus easier to understand.

2.3.2 Communications Services

Operations Communications Services are services built on top of the services provided by the Communication Local Commnunications Access library, lcmai 10. Some services available here map directly to services from lcmai 10, in FIG. 2 while others have added value such as increased abstraction or information hiding.

The main addition to the Operations 4 functionality is that messages are not explicitly received. Instead callbacks for various messages are installed and a message handling loop is activated. This same message handling loop is used by all tasks, saving effort and enforcing consistency.

Other added functionality includes automatic platform independent message packing/unpacking, message duplicating, remote procedure call functionality and communication and other alarm notification (Communication Alarms 40 in FIG. 2). This component also serves the purpose of hiding the interface to lcmai from other task components and clients thereof.

2.3.3 Support Services

Support Services 43 in FIG. 1 is a group of services that provide more convenient access to operating system functionality and other low level services. This includes task debug/log services, memory management services, timer services and system command execution services.

2.4 Communication Components Overview

2.4.1 Local Communications Access

Local Communications Access 48 encompasses the client and server portions of communications access.

The lcmai library 10 provides access to Communication functionality available to client tasks of the invention (Tasktalk). It provides the raw messaging and remote procedure call (RPC) functionality through the <node, port> addressing abstraction. A library is built from this component that is linked into the Tasktalk library 8 that is linked into all client tasks of this invention (Tasktalk).

Message Routing 9, provided by the lcmnc task 5, is responsible for routing all support and application task messages within nodes from one task to another. This includes routing messages to the Internet, Bisync 3270 53 and LAPB 52 message delivery tasks (lcmlc 17, lcmlb 20, and lcmpc 21 tasks respectively) for messages that must be forwarded to other nodes. The lcmnc task also allocates communication ports for all other tasks on its node, and reports routing information to the monT 80 task in the Communications Services 40 module of the Operations 4 layer.

2.4.2 Configuration Services

Configuration Services are provided by the communications database task lcmdb 14, which reads in the configuration files lcmdb.conf 16, lapb.conf 98, and poll.conf 15. These files contain lists of nodes that can be reached using various protocols (IP, LAPB, Bisync 3270) and also indirect routing tables that specify nodes that can be reached by going through other nodes. lcmdb14 then serves this information to other communications tasks when requested. Distribution of the configuration files is done by lcmdb14.

2.4.3 IP Message Delivery

The IP Message Delivery task, lcmlc 17, handles forwarding messages from one node to another (to its instance of lcmlc 17) over an IP network using UDP (a well known protocol) datagrams. It also monitors the communication link status to directly connected nodes (the list of which is obtained from lcmdb 14), and notifies monT 80, in the Communication Services component, of any status changes.

2.4.4 LAPB Message Delivery

The LAPB Message Delivery task (lcmlb 20) handles forwarding messages from one node to another over serial lines using the well known LAPB protocol. It also monitors communications link status to directly connected nodes (the list of which is obtained from lcmdb 14), and notifies monT, in the Communication Services component, of any status changes.

2.4.5 Bisync 3270 Message Delivery

The Bisync 3270 Message Delivery task lcmpc 21 handles forwarding messages from one node to another using the 3270 Bisync multipoint master protocol. It also monitors the communication link status to directly connected nodes (the list of which is obtained from lcmdb), and notifies monT, in the Communication Services component, of any status changes.

2.4.6 Application Access

Application Access 6 provides IP based access to remote services (such as starting remote nodes or GUIs) that reside on other nodes. Since the other nodes may not be currently running or reachable, regular communications may not be used. A daemon process, inaas.d 6a, runs on each host, and it reads a configuration file to see what applications it can "serve". Requests from client tasks are made after establishing a socket connection to inaas.d (6a)'s well known IP port. Successful requests result in inaas.d starting the access agent for the given service application, and a connection back to the client task from the access agent is established. Information specific to the requested service can then be exchanged between the client task and the access agent over the connection.

2.5 Other Components

2.5.1 rsdsl rsdsl 19 (the reliable sequenced datagram service library) is linked into a client task (lcmlc17 is its only client at present) to provide reliable UDP based datagram services.

2.5.2 ullpl ullpl 18 is the LAPB protocol library, which is linked into client tasks (lcmlb is its only client at present) to provide LAPB protocol communications services.

2.6 Internal Interfaces

2.6.1 OPERATIONS Internal Interfaces

There are no internal interfaces between Operations components since Operations services access each other through the public Tasktalk API supported by those components detailed in INTERFACES.

2.6.2 Operations Support Services <—> COMMUNICATION components

This interface specifies the message types and structures for messages used by COMMUNICATION components to report communications link status to the monitor task, monT, in Communication Services. lcmnc 5 provides a list of directly connected, and routed, nodes to (that is a list of all the nodes that communications can reach from the current node). lcmlc 5, lcmlb 20, and lcmpc 21 report node communication statuses.

2.6.3 Local Communications Access <—> Communications Services (+others)

This interface specifies how tasks obtain access to intra node communications services. These services are provided by the Local Communications Access library, lcmai, that is linked into an executable task and provides Tasktalk network port allocation, message delivery and remote procedure call (RPC) services.

2.6.4 Configuration Services <—> Message Routing/Delivery

This interface consists of the update requests, messages, and responses that pass between lcmdb 14 and its clients lcmnc 5, lcmlb 20, lcmlc 17, and lcmpc 21.

2.6.5 Application Access <—> IP Message Delivery

This interface is a C language API that specifies a single function, inaas_request_application(), that lcmlc 17 uses to get access to lcmlc's running on remote nodes. In particular, lcmlc 17 uses it to discover the dynamically assigned UDP port used by remote lcmlc tasks. This UDP port is required by lcmlc in order to establish inter node communications over IP.

2.6.6 IP Message Delivery <—> rsdsl Interface

There are functions to initialized datagram service, add and delete datagram channels, enquire about parameters of the communication channels, send messages, and to control the timing used to give control to rsdsl routines.

When rsdsl 19 is initialized, several callback functions are supplied that are called by rsdsl to have received messages handled, do cleanup when necessary, handle status messages, and to schedule the next time rsdsl will get control.

2.6.7 LAPB Message Delivery <—> ullpl interface

This interface is very similar in structure to that in section IP Message Delivery <—> rsdsl Interface.

2.7 Design Motivation 2.7.1 Architecture 2.7.1.a The architecture of the OPERATIONS components was chosen to isolate changes in the internode communications (lcmlc 17, lcmlb 20, lcmpc 21) channels from those for intra node communications and routing (lcmnc 5). By separating internode communications functions into separate tasks, the architecture allows additional internode communications functionality (e.g. native ATM communications task) to be added more readily.

2.7.1.b Parsing of and resynchronizing configuration information is controlled by lcmdb 14 to avoid duplicating this functionality in many tasks. This also allows the other tasks to be more responsive during updates since long delays in service that might occur while reading a new configuration file, or receiving the configuration file from a master lcmlb 20, are avoided.

2.7.1.c. Internode routing is handled by lcmnc 5 and so is independent of what internode communications protocols are used between nodes. This avoids differences in routing protocols between communications protocols, so that routing support is uniform across communications protocols.

2.7.2 Reliability Considerations

The internode communications tasks have been designed to expect and react to loss of connectivity to other nodes and to automatically sync up when connectivity is restored (which is detected by periodic polling).

2.7.3 Performance Considerations

To ensure quick response of message handling tasks (lcmlc 17, lcmnc 5, lcmlb 20, lcmpc 21), long or potentially blocking activities must be avoided. This has been accomplished by farming the potential blocking activities to forked children (that do not handle messages), and splitting long activities into smaller manageable chunks. This splitting up of actions to be taken is supported by functionality built into Communication Support Services.

3 COMPONENTS 3.1 Local Communications Access 3.1.1 Introduction

Local Communications Access provides a library, lcmai 10, to allow access to COMMUNICATION communication functionality. The interface provided by this library includes functions for allocation of communication ports, message delivery over these ports, as well as RPC services.

Provision of many of the services provided by library lcmai 10 are actually shared between it, acting as a client, and the message router task lcmnc 5 , which provides the services. lcmnc 5 and library lcmai 10 are treated as a single component because they are very tightly coupled.

Message delivery at four different priorities (from High to Low) and remote procedure calls services are supported. There is a limit to the length of messages that depends on the priority of the message.

3.1.2 High Level Design Details 3.1.2.a Overview

Other tasks obtain communications ports through library lcmai 10 from lcmnc 5. lcmnc 5 keeps track of all system ports assigned on the node to facilitate message routing. This information is stored in a shared memory segment that all tasks can access using the lcmai.a 10 library. The number of system (Tasktalk) ports that lcmnc 5 can make available for use by other tasks on the node is limited by the size of the shared memory segment and is set at startup of lcmnc 5 using the –M option. In the current embodiment, messages are actually sent using System V IPC message queues— lcmnc 5 allocates a send and receive queue per communications port and manages the port to message queue mappings for all tasks.

For local messages (messages from one task to another on the same node) lcmnc 5 just forwards the message from one message queue to the other. For messages to remote nodes, lcmnc 5 uses information obtained from lcmdb 14 to determine which protocol task (lcmlc 17, lcmlb 20, or lcmpc 21) the message should be forwarded to. It is then the protocol task's responsibility to deliver the message to the corresponding protocol task on the destination node, which will forward it to its local message router task.

3.1.2.b How to use the API

Messages are sent using calls similar to the one below:

```
COM_RETURN_STAT_T com_Send_to(
COM_NETADDR_T  remote_addr,   /* Message destination */
COM_PORT_T     local_Port,    /* Communication Port Id */
U2_T           priority,      /* Message priority. */
int            msgflg,        /* Message flags */
U2_T           msg_len,       /* Message length */
COM_NETBYTE_T  *msg_body )    /* Message body */
```

For the destination of the message, we need to specify all the elements of the structure shown below:

TABLE 3-1

Specification of remote addresses

| Structure member | Comments |
| --- | --- |
| remote_addr.node_id_v | |
| remote_addr.node_typ_v | example AT_NCPC_C |
| remote_addr.port_v.port_number_v | |
| remote_addr.port_id_v.port_typ_v | PT_GEN_C or PT_RPCSRV_C |

For the source, one of the local ports obtained through the function com_get_multiport() will usually be specified:

TABLE 3-2

Specification of local port from which to send message or make RPC call

| Structure member | Comments |
| --- | --- |
| local_port.port_number_v | not necessarily a port we have obtained from lcmnc |
| local_port.port_typ_y | usually PT_GEN_C (or PT_RPCSRV_C) |

The priority must be chosen from one of the following levels:

TABLE 3-3

Available priority levels

| priority | comment |
|---|---|
| COM_HIPRI | often used for short important messages |
| COM_MHIPRI | |
| COM_MLOPRI | |
| COM_LOPRI | often used for general purpose messages |

For the msgflg, the usual ones of interest are:

TABLE 3-4

Message flags of common use

| msgflg | comment |
|---|---|
| 0 | do not return until a message is available, the default case |
| IPC_NOWAIT | force nonblocking, return immediately if no message pending |

The message length, msg_len, is the length of the message (not the size of the buffer), and the text of the message, in network form, is stored in the buffer msg-body.

3.1.2a Interface between lcmai.a and lcmnc

Here's what's in the shared memory segment:

TABLE 3-5

Contents of shared memory segment

| com_shared_memory_ptr-> | typical value |
|---|---|
| csm_network_task_status | 0 |
| csm_maximum_high_port | 65520 |
| csm_maximum_low_port | 49151 |
| csm_maximum_ports | 60 |
| csm_minimum_high_port | 65520 |
| csm_minimum_low_port | 1 |
| my_node_id | 101 |
| my_node_type | 17 |
| csm_port_status[0] | see below |
| csm_port_status[1] | |
| ... | |

TABLE 3-6

Contents of csm-port-status[] records in shared memory segment

| | Typical Values | | | |
|---|---|---|---|---|
| Member | csm_port_status[0] | ... [1] | ... [2] | ... [3] |
| receive_queue | 651 | 554 | 505 | 0 |
| send_queue | 652 | 653 | 653 | 0 |
| port_status | 0 | 1 | 1 | 0 |
| port_priority | 0 | 0 | 0 | 0 |
| proc_id | 5557 | 5559 | 5572 | 0 |
| port_id ... port_number_v | 0 | 1004 | 1020 | 0 |
| port_id ... port_typ_v | 0 | 1 | 1 | 0 |
| port_id ... port_number_v | 0 | 1004 | 1020 | 0 |
| port_id ... port_typ_v | 0 | 1 | 1 | 0 |
| extra_data | 0 × 0 | 0 × 0 | 0 × 0 | 0 × 0 |

TABLE 3-7

Port status bit masks used in port status rec

| Name | Value | Comment |
|---|---|---|
| MSPI_PORT_ASSGND | ((U2_T)(1<<0)) | /* Port assigned */ |
| MSPI_PORT_CLOSNG | ((U2_T)(1<<1)) | /* Close in progress */ |
| MSPI_PORT_CNCTNG | ((U2_T)(1<<2)) | /* Connect in progress */ |
| MSPI_PORT_CMONLY | ((U2_T)(1<<3)) | /* Comms of only */ |
| MSPI_PORT_ERROR | ((U2_T)(1<<4)) | /* Error condition. */ |
| MSPI_PORT_EXCLSV | ((U2_T)(1<<5)) | /* Error condition. */ |

```
typedef struct net_addr {
U2_T node_id_v;
COM_ADDR_TYP_T node_typ_v;
COM_PORT_T port_id_v;
} COM_NETADDR_T;
```

3.2 Communication Support Services 3.2.1 Introduction

Communication Support Services provide general purpose functionality such as I/O utilities, timer utilities, communications database management, etc. There are a number of interfaces provided by support services that are used by other Communication (Talk) components.

3.2.2 Interfaces Provided

There are several interfaces provided by this component. Many of these interfaces are used by nearly all the other Communication (Talk) components while others are only used by a few. Each interface listed below has an assigned keyword name and a general description.

3.2.2.a lcm_general: General purpose data structures and management functions, including:
1. Functions for managing doubly linked lists.
2. Functions for managing actions. Actions are used to split work into small manageable parts that will not cause undue delays in processing.

Interesting data types include: LCM_ACTION_PTR (a definition of an action), LCM_ACTION_FUNCTION (callback that carries out the requested action), LCM_ACTION_HEADER_P (a list to which actions are added), The following functions are defined:

lcm_check_timeout() checks the currently active queued actions for timer expiry, and performs the retry or fail actions for the expired timers.

lcm_delete_action() removes the specified action from its action header (if any).

lcm_queue_action() adds the given action to the specified action list. If the action was already in another action list, it will be removed without warning.

lcm_init_action headers adds the given action to the specified action list. If the action was already in another action list, it will be removed without warning.

lcm_init_action item() adds the given action to the specified action list. If the action was already in another action list, it will be removed without warning.
3. General communications database type definitions and management functions.
4. Functions used in converting address types.

3.2.2.b lcm_xdr: XDR packing/unpacking functions, including:
1. XDR pack and unpack functions provided for compatibility with Task support tasks.

3.2.2.c lcm_timer: Timer functions, including:
1. Functions for setting up and using timer events.

3.2.2.d lcm_route: Message routing functions and data structures, including:

1. Functions and data types used in message routing.

3.2.2.e lcm_config: Configuration update message definitions and pack/unpack functions, including:
1. Support functions for communications database update functionality.

3.2.2.f lcm_lan: Lan communication database structures and management functions, including:
1. Lan communications database types and utility functions.
2. Utility functions and services for EP interfaces.

3.2.2.g lcm_alarm: Communications alarm reporting functions, including:
1. Functions for formatting and sending communication alarms to the TASK layer.

3.2.2.h lcm_lapb: LAPB communications database structures and management functions, including:
1. lapb addresses and message types 3.2.2.i lcm_poll: Bisync 3270 polling database structures and management functions, including:
1. Synchronous polling addresses and message types.

3.3 Configuration Services

3.3.1 Introduction lcmdb 14, the communications database task, reads in three configuration files, lcmdb.conf 16, lapb.conf 98, and poll.conf 15, which contain lists of nodes that can be reached using various protocols (IP, LAPB, Bisync 3270 respectively). The configuration files also contain indirect routing tables that specify nodes that can be reached by going through other nodes. It then serves this information to other communications tasks as requested.

The configuration files are distributed to the nodes by lcmdb from a master lcmdb 14 running on a configuration server node. The address information required to connect to the configuration server node is set up when the node is installed on a host computer. Provision is also made for specifying a secondary configuration server node. Once the information for the configuration files is received from a configuration server, it is stored, and a messaging mechanism using version numbers is used to determine when updates to the files are required.

3.3.2 Interfaces Provided lcmdb provides a message accessible communications database access interface to other COMMUNICATION component executable tasks. This service is accessed by sending the appropriate database request message to lcmdb 14, which responds by sending a number of database update messages to the requester for processing.

3.3.3 Interfaces Used

Configuration Services 49 uses some of the interfaces provided by Communication Support Services 51 that are documented in Interfaces Provided. In particular, it uses: lcm_general, lcm_Config, lcm_lan, lcm_lapb, lcm_poll, lcm_route.

3.3.4 High Level Design Details

At startup lcmdb14 processes all its configuration files, gets its well known communications port and then sits waiting for messages. The main message types of interest are:

COM_CONFIG_UPDATE_REQ, and XXX_CTL_NEWDB_REQ, where XXX=[LAN 1 LAPB 1 POLL].

When a COM_CONFIG_UPDATE_REQ messages is received, lcmdb reprocesses its configuration files (see routine lcmdb_filter_files) and queues an action item on the db_updates queue with the details of the request. The LCM_ACTION_FUNCTION for this queue is db_do_update() which calls lcmdb_continue_update() to do the work. A DB_CONTROL_R data structure referred to as db_control is used to coordinate many simultaneous update operations.

db_do_update causes db_config_update() to be called for each of the tasks that need to be notified, which in turn calls db_send_dbid_message() to send the notification message to the router task. The other communications tasks are notified if needed also in lcmdb_continue-update through calls to functions pointed to by db_iptr→di_step (db_iptr is data type DB_ITERATE_P).

3.4 IP Message Delivery

3.4.1 Introduction

The Ian protocol task, lcmlc, which is the main product of the IP Message Delivery component, handles forwarding messages from one node to another (to it's instance of lcmlc) over an IP network using UDP datagrams. It also monitors the communication link status of these directly connected nodes (the list of which is obtained from lcmdb, see Configuration Services), and notifies the monitor task, monT, of any status changes. Communication link monitoring is accomplished by: i) periodic network polling,; and ii) an lcmlc task on a node that is about to shutdown will notify the lcmlc tasks on all directly connected nodes so that they know immediately that communications to the shutdown node is down.

Each node's lcmlc uses a set of IP numbers (one for each network interface on the host on which it is running) and UDP port numbers. While lcmlc's on different machines know each other's IP addresses (listed in /etc/hosts or accessed using domain name service), they cannot know each other's UDP ports because they are assigned dynamically, i.e. every time an lcmlc is started it gets new and unknowable UDP port numbers. This is true even of two instances of lcmlc running on the same host. This information is accessed using functionality provided by the Application Access component. lcmlc forks a child, referred to as the hunter, that does this UDP port number resolution. The hunter receives periodic directives from its parent, since this process is time consuming and subject to irregular delays.

3.4.2 Interfaces Used

IP Message Delivery uses some of the interfaces provided by Communication Support Services that are documented in s.3.2.2. Interfaces Provided. In particular, it uses: lcm_general, lcm_config, lcm_lan, lcm_alarm, lcm_route and lcm_timer. It also uses interfaces provided by the Application Access and rsdsl components.

3.5 LAPB Message Delivery

3.5.1 Introduction

The LAPB Message Delivery task 52 (lcmlb) handles forwarding messages from one node to another over serial lines using the LAPB protocol. It also maintains a link status to directly connected nodes (the list of which is obtained from lcmdb) by polling, which is forwarded to monT in the Communication Services component. For nodes where the connection is via a modem, lcmlb does have modem control features to establish the connection to the node. lcmlb is used to talk to AVT terminals, which run proprietary firmware. It cannot be used to talk to other lcmlb's (it is not symmetric like lcmlc is).

lcmlb 20 obtains the list of nodes (and the serial devices to use to contact each) from lcmdb 14 at startup and whenever the configuration is changed.

3.5.2 Interfaces Used

LAPB Message Delivery uses some of the interfaces provided by Communication Support Services that are documented in s.3.2.2. Interfaces Provided. In particular, it uses: lcm_general, lcm_config, lcm_lapb, lcm_alarm, lcm_route and lcm_timer. It also uses interfaces provided by the ullpl component.

3.6 Bisync 3270 Message Delivery
3.6.1 Introduction

The Bisync 3270 Message Delivery task (lcmpc) handles forwarding messages from one node to another over serial lines using the Bisync 3270 protocol. It also maintains a link status to directly connected nodes (the list of which is obtained from lcmdb) by polling, which is forwarded to monT in the Communications Services component.

lcmpc is used to talk to proprietary communication hardware and firmware. It cannot be used to talk to other lcmpc's (it is not symmetric like lcmlc is).

lcmpe obtains the list of nodes from lcmdb at startup and whenever the configuration is changed.

3.6.2 Interfaces Used

Bisync 3270 Message Delivery 53 uses some of the interfaces provided by Communication Support Services that are documented in s.3.2.2. in Interfaces Provided. In particular, it uses: lcm_general, lcm_config, lcm_lapb, lcm_alarm, lcm_route and lcm_timer.

3.7 Application Access
3.7.1 Introduction

FIG. 5 gives a short overview of how Application Access works. A client task 57 on host B 60, which links in the application access library lcmaa.a 58, makes a socket connection to the application access daemon process, called inaas.d 6a, (usually on a different host [host A 59] but not necessarily), which forks a child to handle each request. The client next writes information down this socket to identify the application it wishes to have access to. The child inaas.d 55 compares this request with those applications configured in inaas.conf 13 and, if a match is found, starts the appropriate access agent. At this point a socket connection exists between the client task 57 and the access agent 56 for the requested application (which has replaced the child inaas.d). Application specific information is then exchanged over this socket between the client and the access agent 56.

Application Access provides i) an application access client library lcmaa.a 58; ii) an application access daemon process inaas.d 6a; iii) several paired special purpose access agent 56 and client tasks 57 (inaas_test→lcmar, inaas_rg→lcmdt); and iv) a file specification for the inaas.conf file 13, used to specify which services an inaas.d daemon process can serve. inaas.d 6a provides services similar to RPC portmap, that is, given an identifier for an application (in this case a host name, application type, and application instance, which are all strings), inaas.d provides a socket connection to the designated access agent, usually lcmar or lcmdt. Information is usually exchanged over this socket connection (for example UDP port numbers) between a client task and the access agent to access and/or startup Internet applications.

The simple client inaas_test connects to the access agent lcmar and prints out the UDP port of a remote node received from lcmar. lcmar is the access agent that starts up and/or connects to a node, and provides access to the node's UDP port number (to lcmlc or inaas_test).

The client, inaas_rg 62 connects to the access agent lcmdt 61, which provides access to desktop monitor user interface startup. lcmdt 61 is analogous to lcmar, being the access agent that is used to startup remote desktop monitor user interfaces and display them back to the node on which inaas_rg is running.

In the following discussion, only lcmaa, lcmas and lcmar will be mentioned. The same information applies if lcmrg is substituted for lcmaa and lcmdt is substituted for lcmar (except where specifically noted).

3.7.2 Interfaces Provided

Application Access provides several different interfaces, enumerated below.
1. The application access library lcmaa.a provides a simple API with a single function call:

```
int inaas_request_application(
    char          *    ira_hostname,
    char          *    ira_ip_protocol,
    char          *    ira_app_identifier,
    char          *    ira_app_instance,
    int                ira_timeout );
```

This function returns the file descriptor of the socket connected to the access agent for the requested application.
2. Two simple client's are provided, inaas_test and inaas_rg. Their command line arguments specify the interface they provide:
   >client_task hostname application_type application_instance where hostname identifies the which host'sinaas.d to contact and the application type and instance are used to identify a service on the host. For more details see the specification of the format for the application access daemon's configuration file, inaas-.conf.
3. The access agent lcmar 67, which is used for node startup and UDP port discovery, is intended to be used by other clients besides inaas_test. It provides an interface that is the (request, response) pair to be sent over the socket between it and a client. There is only a single request supported which is a request for the remote node's UDP port. The response is either "OK=<nodeid>:<ipNumber>:<portNumber>\n" or "FAIL=<reason>\n" where the items in <>'s will be replaced with appropriate values.

3.7.3 Interfaces Used

Application Access uses some of the interfaces provided by Communication Support Services that are documented in s.3.2.2. Interfaces Provided. In particular, it uses: lcm_general, and lcm_lan.

3.7.4 High Level Design Details
3.7.4.1 Architectural Overview

Referring to FIG. 6, Application Access is divided into five modules: lcmas 69, lcmar 67, lcmaa 68, lcmdt 61 and lcmrg 62. See 3.2 Application Access Component Block Diagram for an overview of information flows and process invocation events between the modules and external components and subsystems.

The general pattern is that an access client (cmrg 62, inaas_test from lcmaa, IP Message Delivery) calls inaas_request_application() from the lcmaa module library 68, which makes a socket connection to the inaas.d daemon process (module lcmas 69) on the requested host. At this point inaas.d forks a child which execs lcmas-vr, which handles the upcoming request. The lcmas_vr process is, therefore, a child process of the inaas.d daemon process. Information is exchanged between the client and lcmas_vr (child of inaas.d) through the lcmaa module library function inaas_request_application() on the client side. If a valid request is submitted, lcmas_vr execs the appropriate access agent (lcmar or lcmdt), and inaas_request_application() returns with the file descriptor of the socket which still maintains the connection. At this point, the client task is directly connected via the socket to the access agent, and further application specific information is exchanged over this socket.

The access agent lcmar uses Local Communications Access to request the list of UDP port numbers from IP Message Delivery 66 which it searches to find the appropriate one to return to its client over the socket.

3.7.4.2 Modules
3.7.4.2.1 lcmar
3.7.4.2.1.a Important Routines main(). This is the main line of lcmar, which does the following:
1. invoke lcmar_init_task to parse command line options.
2. checks that the socket to which it is connected is on the local lan if required.
3. reads request over socket from client and compares it with expected value.
4. gets a semaphore to prevent simultaneous lcmar's trying to start the same node.
5. checks whether the node is already up using lcm_ping_system.
6. if node is up, skip to step 8
7. invoked the startup script specified on the command line.
8. check whether node is up, die and release semaphore if fails.
9. release semaphore protection.
10. invoke query_ip_addrs to get all the UDP ports from lcmlc.
11. find if one of these matches the network part of the clients socket address.
12. return the matching UDP port in OK message or log a FAIL message over the socket.

lcmar_init_task(). This routine parses the command line options to lcmar and sets up some global variables and environment variables for later use.

lcmar_ping-system(). This routine sends a message to the echo port on the current node and waits for a response. If the node is up it will get a return message.

lcmar_start_system(). This routine invokes the startup script (given as a command line parameter) and waits for it to return.

query_ip_addrs(). This routine packs the request message to lcmlc for the list of UDP ports and sends the message. It waits for the response which it returns after some processing.

3.7.4.2.2 lcmaa
3.7.4.2.2.a Important Routines
3.7.4.2.2.b inaas_request_application(). This routine is part of the interface to Application Access documented in s.3.2.2. Interfaces Provided. Client tasks invoke this routine to gain access to (usually) remote application agents. This routine sets up a connection to the remote inaas.d daemon and exchanges information to identify the requested application. If the request is successful, it returns the socket that is now connected to the access agent.

3.7.4.2.2.c main(). This is the main line for client inaas_test that is invoked by start_node.

3.7.4.2.3 lcmas
3.7.4.2.3.a Important Routines () main. This routine is the mainline for inaas.d. It opens and binds a socket to the inaas port from /etc/services. It then listens on this port and forks a child server whenever a valid connection is established, and goes back to listening.

lcmas_vr script. This is a PERL script that is forked by inaas.d to handle requests. The child server parses inaas.conf, reads in the request (in two parts) over the socket which is attached to its stdin, and sends back responses through stdout which is connected to the socket. If the request matches an application configured in inaas.conf, the listed application access agent is exec'ed in place of this script.

3.7.5 Application Access and Tasktalk Network Startup

An aspect of the interaction of the modules of the Application Access component and lcmlc, acting as an application access client, that should be not be overlooked is that it provides a simple, powerful way, to start a network in accordance with this invention that is completely shutdown. As discussed in the above section on the lcmar component, and in the event sequence "Start Up", lcmar will initiate node startup if it finds that the node it must obtain the UDP port address for is down. This node will be called node A. The UDP port address is required by an lcmlc task on another node, node B, that needs to communicate directly with node A. Once node A has started, it will try to connect to all the nodes it must talk directly to, and in the process, start any of those nodes that were down. Once all of node A's directly connected nodes start, they will also try to connect to all their directly connected nodes. This process will continue until all nodes in the network are up and communicating with each other as specified in their communication configuration files lcmdb.conf.

The result, then, of starting a node as soon as another node attempts to establish communications to it, is that the entire network can be started by starting any one of the nodes in the network. As well, if a node goes down unexpectedly, the lcmlc tasks of directly connected nodes will attempt to re-establish communications to it, so as soon as the failed node can be started, it will be started. In point of fact, a network operator for a network based on this invention must take explicit action to keep a node down, if required, as opposed to having to take action to get a node up if it has gone down.

3.8 Operations FrameWork
3.8.1 Introduction

The Operations framework is responsible for making it simpler and faster to build executable tasks using the system of the invention by providing implementation for common task activities including: startup, argument processing, generic error condition handling, task shutdown, etc. This framework also forces most system tasks to be similarly structured, making them more consistent and thus easier to understand.

Figure 7:
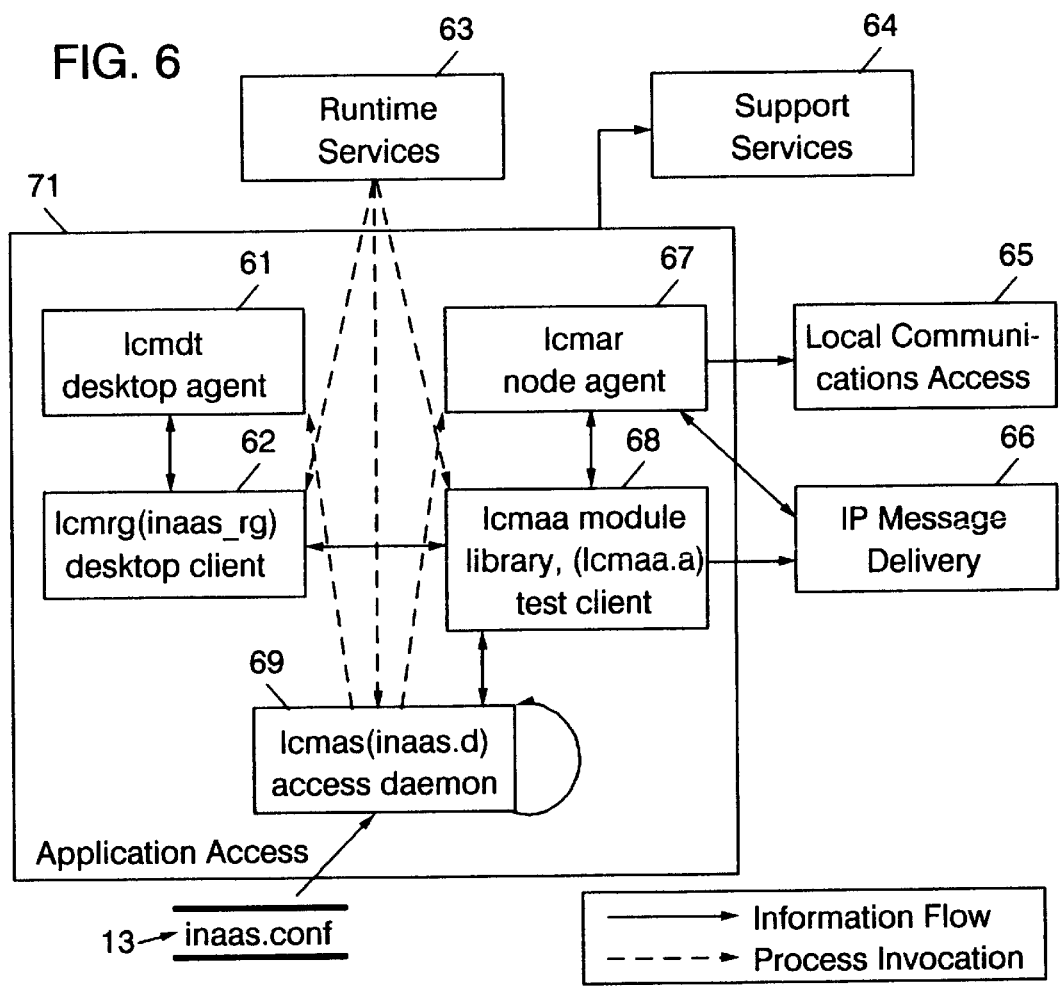
FIG. 7 depicts a Server Task.

A typical server task will be structured as shown in FIG. 7.

The task will call tsk-open Task(), then provide some task specific initialization code at startup. It will then get a well known communications port, using tsk-openPort(), so other tasks can reach it to request services, and set it as the blocking port using tsk_setBlockingPort(). Then a set of callback functions will be installed using tsk_installCallBack() (see Communication Services) that will be activated later when appropriate messages are received. Finally tsk_startProcessingEvents() (the message handling loop) will be called to start processing messages. The task will normally end by user defined code calling tsk—exit() or tsk_closetask().

3.8.2 Interfaces Provided
This component provides part of the Tasktalk API.
3.9 Communications Services
3.9.1 Introduction OPERATIONS Communications Services are services built on top of those provided by the COMMUNICATION Local Communications Access component. Some services available here map directly on to services from the Local Communications Access component library lcmai, though with added value, while others are completely new.

The main extension of the COMMUNICATION communications functionality is that client tasks do not explicitly receive messages. Instead they install callbacks for various message types or sources of messages and then activate the supplied message handling loop by calling tsk_startProcessingEvents().

Other value added services include: abstraction/extension of communications addresses (primarily in the use of ports); message buffering to reduce kernel memory usage; the ability to use arbitrary length messages using message segmentation (library lcmai only supports messages shorter than COM_LOPRI_LEN=2048); and the packaging of received messages, along with other pertinent information into special TSK_MSG_HANDLER_PROC_T structures for more convenient argument passing. These are used extensively with the callback mechanism just described.

New services include: message duplication; communication link status query and status change notification; task management including status query and status change notification; and automatic pack/unpack of structures to be sent in messages.

Message duplication services are used when the intended receiver tasks of a broadcast message is unknown, and/or there is more than one intended receiver task. The message is sent to a special "duplicator address", where it is received by the dupT task, and forwarded to all interested receiver tasks. The receiver tasks will have previously registered with dupT to receive the messages they are interested in.

The communication link status service provides link status query routines, and automatic notification of changes in communication link status to remote nodes (establishment or loss of communications). The status of communication links to remote nodes is available from monT, which in concert with the other communications tasks (the message delivery tasks lcmlc, lcmlb, and lcmpc) and remote node's monTs maintains up to date status information. For details on this interaction between monT tasks, see the event sequence "Communication Link Status Change Notification". As mentioned in connection with the Local Communications Access component, monT must know the routes between nodes so that it can determine which nodes are unreachable when a routing node goes down.

Operations management services are provided by the tmgT tasks in concert with monT. To provide this service, tmgT plays an analogous role to the message delivery tasks in the communication link status service. Instead of monitoring communication link status, tmgT monitors the status of all the tasks that comprise a node. If a task on the node has died or is otherwise not responding, tmgT reports the change in the node's task status tomonT, and then initiates corrective action. This may only require restarting the task, or restarting the entire node. Tasks can register for automatic notification of changes to a node'stask status, and the task status can be propagated to other nodes in the network using a mechanism very similar to that described in the event sequence "Communication Link Status Change Notification". Besides it's obvious use in detecting problems in the network, the task management services are also used during a cold node or network startup. As nodes startup around the network, application tasks will want to establish an information exchange with tasks on other nodes in the network. Using the task management services, an application task can be notified when all tasks on a particular node are up.

Using SUN'srpcgen functionality, this component also adds the ability to automatically pack a message structure in a platform independent manner (managing the necessary memory allocation/deallocation) and send it in a message or use it in an RPC call. Automatic unpacking of these messages is also supported. For all these functions, the pack/unpack function (which produces architecture independent packed data) xdr_YOUR_STRUCTURE_NAME must be supplied. The code for this function will have been automatically generated by rpcgen.

3.9.2 Interfaces Provided

This component provides part of the Tasktalk API.

3.10 Operations Support Services 3.10.1 Introduction

Operations Support Services is a group of services that provide more convenient access to operating system functionality and other low level services. This includes task debug/log services, timer services and command execution services.

Timer Services are used by clients of the system of the invention to replace calls to the POSIX alarm() system function. Timer Services add value because they support more than just second resolution, can provide both message and signal based notification, and can support multiple active timers. The timT task provides a large portion of this functionality.

Command Services provide clients of system of the invention with the ability to run Unix commands on remote nodes, much like rsh or rcmd. Value is added because these services provide a platform independent API, hide the network topology, and also provide convenient asynchronous notification of status changes in running commands. There is no interactivity to remotely executed commands except for returned results.

Debug/Log Services support application task debugging, execution tracing, stack and memory dumps etc.

3.10.2 Interfaces Provided

This component provides part of the Tasktalk API.

3.11 Reliable Sequences Datagram Service Library, rsdsl 3.11.1 Introduction rsdsl, or the reliable sequenced datagram service library, is linked into a client task to provide reliable UDP based datagram services.

3.12 ullpl 3.12.1 Introduction ullpl is the LAPB protocol library, which is linked into client tasks to provide LAPB protocol communications services.

4 INTERFACES 4.1 Interfaces Used 4.1.1 Configuration File lcmdb.conf lcmdb.conf is one of the configuration files for the COMMUNICATION Configuration Services task, lcmdb. Each node has its own unique lcmdb.conf file. The file specifies which remote nodes should be reachable over IP and any indirect routing.

4.1.1.a File Format

The file can have three different types of entries in it, as well as blank lines and comments (that begin with #'s) which are ignored. There is a VERSION specification line, used by lcmdb to determine if its copy of lcmdb.conf is up to date, and then COM_ADDRESS and COM_ROUTING entries for appropriate nodes. The formats of the latter two are given below:

COM_ADDRESS=node_id:comm_type:hostname:app_id:app_inst

COM_ROUTING=parent id:PRI:node_id, comm_type

The fields are as follows:

| | |
|---|---|
| node_id | Numeric node id. |
| comm_type | Communication type of node. |
| hostname | Unqualified internet hostname of the host on which the node runs. |
| app_id | Application Identifier, a printable text string, of up to 64 characters, taken from [a-zA-Z0–9-_]. |
| app_inst | Application Instance, a printable text string, up to 64 characters, taken from [a-zA-Z0–9-_] |
| parent_id | Numeric node id of parent node, the one through which all messages to the node in question should be routed. |

Here's some sample line from a Video Conferencing system:

COM_ADDRESS=1085:AT_SNPC:atdncpc5:wave_vcsc:vcsc_1085

COM_ROUTING=51:PRI:554,AT_VCIU

The first of these specifies a BMS node (communications type AT_SNPC) that lives on the host atdncpc5 with node id 1085 that can be reached directly over TCP/IP. The second specifies a terminal (AVT) node with node id 554 that can only be reached through node 51 (which is an SNC).

4.1.2 Configuration File lapb.conf lapb.conf is the configuration file for the LAPB Message Delivery task lcmlb. It is read by lcmdb and the parsed information is forwarded to lcmlb. It details the necessary configuration for a node to talk to other nodes over serial links using the LAPB protocol. This is usually only used on SNC (terminal server) nodes.

4.1.2.a File Format

The file can have two different types of entries in it, as well as blank lines and comments (that begin with #'s) which are ignored. There is a VERSION specification line and then LAPB_ADDRESS specification lines. The format for the latter is shown below:

LAPB_ADDRESS=node_id:comm_type:dev_path:dce[:modem-type]

Here are the definitions of each of the fields:

| | |
|---|---|
| node_id | Numeric node id |
| comm_type | Communication type of node. |
| dev_path | Full pathname of serial device to use. |
| modem_type | Case insensitive specification of modem type that is connected to the serial device, omitted if direct serial connection. |

To make this more concrete, consider the example lines taken from a Video Conferencing platform that specify how to communicate with two different terminals:

LAPB_ADDRESS=55 1:AT_VCIU:/dev/ttyh08:dce:usrs

LAPB_ADDRESS=553: AT_VCIU:/dev/microplex1.com1:dce

The first terminal listed, with node id 551, is connected via a USR (US Robotics) modem that is attached to the serial device /dev/ttyh08 (one of the devices created by a multiport serial card driver). The second terminal is connected by what appears to Video Conferencing as a direct serial connection provided by a Microplex print server daemon which creates the device file /dev/bbd_Microplex.coml. No modem specification is required in this case.

4.1.3 Configuration File poll.conf poll.conf is the configuration file for the Bisync 3270 Message Delivery task lcmpc. It is read by lcmdb and the parsed information is forwarded to lcmpc. It details the necessary configuration for a node to talk to other nodes over serial links using the Bisync 3270 protocol. This is usually only used on SNC (terminal server) nodes.

4.1.3.a File Format

The file can have two different types of entries in it, as well as blank lines and comments (that begin with #'s) which are ignored. There is a VERSION specification line and then SPOLL_ADDRESS specification lines. The format for the latter is shown below:

SPOLL_ADDRESS=node_id:comm_type:card_no:card_line_no:sync_poll_addr:asy nc_poll_addr Here are the definitions of each of the fields

| | |
|---|---|
| node_id | Numeric node id |
| comm_type | Communication type of node. |
| card_no | id of the synchronous polling card the node is connected (indirectly) to. |
| card_line_no | line number of the synchronous polling card the node is connected (indirectly) to. |
| sync_poll_addr | The synchronous polling address of the node. |
| async_poll_addr | The asynchronous polling address of the node. |

4.1.4 Configuration File inaas.conf inaas.conf is the configuration file for the Application Access daemon process inaas.d. It describes all the applications (typically Wave nodes and user interface applications) that inaas.d can start and/or connect to.

4.1.4.a File Format

The file consists of entries of the form shown below, one per line, while any lines that are empty or that begin with a # are ignored:

app_id app_inst proto user group agent_prog agent_name [ agent-param . . . ]

Here are the definitions of each of the fields.

| | |
|---|---|
| app_id | Application Identifier, a printable text string, of up to 64 characters taken from [a-zA-Z0–9-_]. |
| app_inst | Application Instance, a printable text string, up to 64 characters, taken from [a-zA-Z0–9--] |
| proto | IP protocol, from/etc/protocols. Usually udp. |
| user | User name on the local machine, not being a priviledged system user. |
| group | The default group for user, from the system password database, not being a privileged system group. |
| agent_prog | The full path to an application agent program that has executed permission to usergroup, without any setuid or set setgid permissions. |
| agent_name | Short version of agent name. |
| agent_param | Parameter(s), if any, for the agent program. |

The combination of app_id, app_inst, proto must be unique in each computer running the inaas server.

To make this more concrete, consider the example line taken from a wave platform that specifies how to start the cnc node:

wave_ncpc ncpc_3 udp cnc wave /u/wave/cnc/bin/lcmar lcmar –d O –S "$HOME/etc/hu"

So, when an Application Access client (inaas-test) asks inaas.d to start the application, wave_ncpc ncpc_3 udp, inaas.d will start up the executable /u/wave/cnc/bin/lcmar as user cnc (group wave) and pass it the parameters –d O –S "$HOME/etclhu ". As it happens, the –S parameter to lcmar specifies the name of a script to be run after setting up the environment. Thus, $HOME/etc/hu is finally run to start up the node.

4.2 Interfaces Provided 4.2.1 Tasktalk API

The Tasktalk API includes definitions of all API functions, relevant data structures, and usage hints and warnings.

4.2.2 Utility tasks inaas_test and inaas_rg

The utility tasks, inaas_test and inaa_rg are exported from the COMMUNICATION component Application Access and are invoked by shell scripts to during the process of starting up a node or a desktop GUI respectively. Both of these tasks take the same command line arguments:

inaas_test hostname app_id app_inst [protocol]

inaas_rg hostname app_id app_inst [protocol]

Here are the definitions of each of the fields (some are the same as for inaas.conf above).

| hostname | The hostname of the unix host on which the application should be run. |
| app_id | Application Identifier, a printable text string, of up to 64 characters, taken from [a-zA-Z0-9-_] |
| app_inst | Application Instance, a printable text string, up to 64 characters, taken from [a-zA-Z0-9-_] |
| protocol | Optional IP protocol specifier, defaults to UDP |

Following along on the example from inaas.conf, the cnc node on host wavehost could be started using the following command:

inaas_test wavehost wave_ncpc ncpc_3 udp

5 EVENT SEQUENCES 5.1 Introduction

The following conventions are used in the event sequence diagrams:

messages sent via the system of the invention (Tasktalk) are shown as dark solid lines;

messages sent via socket connections are shown as light sold lines;

forking or executing a process is shown as a dashed line.

5.2 Normal Operating Sequences 5.2.1 Message Delivery

Figure 8:
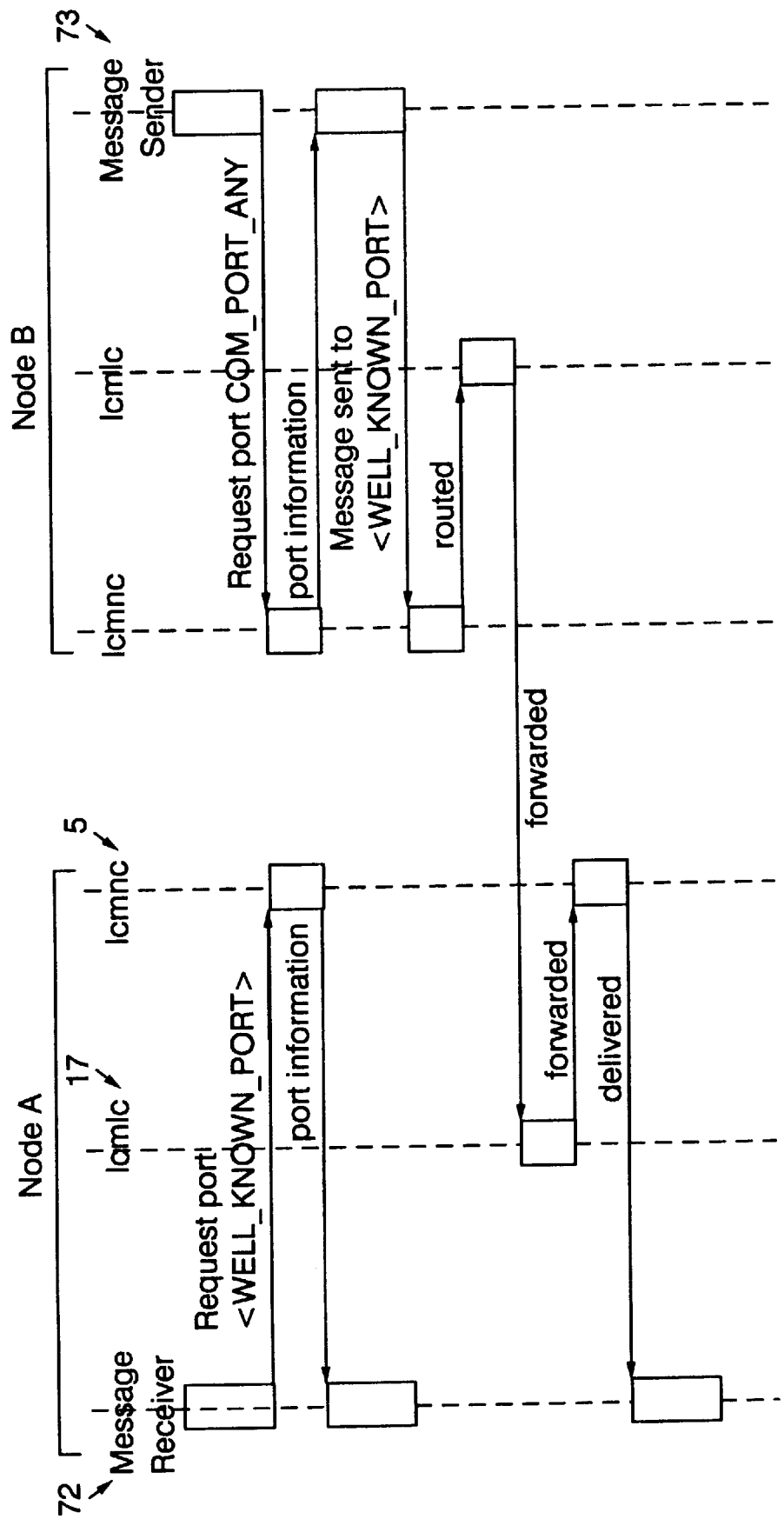
FIG. 8 depicts Message Delivery (a typical event sequence to send a message between two tasks running on different nodes)

FIG. 8 illustrates a typical event sequence to send a message between two tasks running on different nodes.

The message receiver task 72 starts up and gets its well known port, <WELL_KNOWN_PORT>, from lcmnc 5.

The message sender task 73 starts up up and gets a private port from lcmnc.

The message sender task 73 executes function tsk_send() to address <node A, WELL_KNOWN_PORT>. The formatted and packed message is forwarded to lcmnc 5 for handling.

lcmnc 5 determines the message is destined for a different node that is reachable over IP. The message is routed to the IP message task, lcmlc 17.

lcmlc 17 forwards the message to lcmlc on the destination node over IP.

lcmlc 17 on the server node receives the message, checks that it has come to the correct node and forwards it to the router task, lcmnc 5, for delivery. lcmnc 5 looks up the requested port and determines that the message should be forwarded to the message receiver task.

5.2.2 RPC client and server transaction

Figure 9:
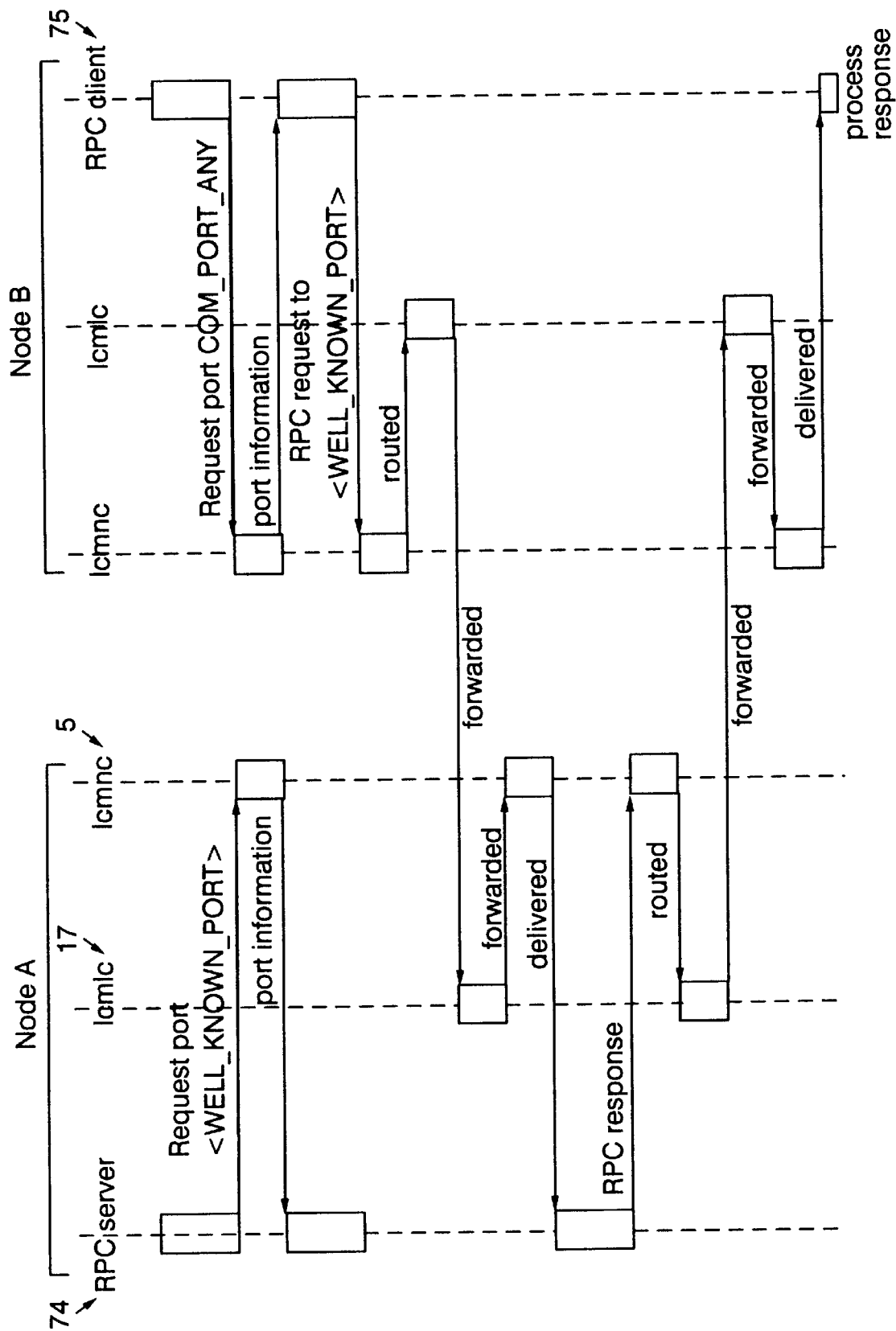
FIG. 9 depicts RPC Client and Server Transaction (a typical sequence of messages sent between a client and server tasks running on different nodes)

FIG. 9 depicts a typical sequence of messages sent between a client and server tasks running on different nodes.

RPC server 74 starts up and gets its well known port, <WELL_KNOWN_PORT>, from lcmnc 17.

RPC client 75 startup up and gets a private port from lcmnc.

RPC client 75 executes function tsk_rpc() to address <node A, WELL_KNOWN_PORT>. The formatted and packed request message is forwarded to lcmnc for handling.

lcmnc 5 determines the message is destined for a different node that is reachable over IP. The message is routed to the IP message task, lcmlc lcmlc 17 forwards the message to lcmlc on the destination node over IP.

lcmlc 17 on the server node receives the message, checks that it has come to the correct node and forwards it to the router task, lcmnc, for delivery.

lcmnc 5 looks up the requested port and determines that the message should be forwarded to the RPC server task 74.

the server task takes some action and generates a response that is directed to the source of the request.

the response message passes to lcmnc which routes it to lcmlc after determining that this new message is destined for a different node that is reachable over IP.

lcmlc on the client node receives the message, checks that it has come to the correct node and forwards it to the router task, lcmnc, for delivery.

lcmnc delivers the response message to the RPC client 75.

5.2.3 Communication Link Status Change Notification

Figure 10:
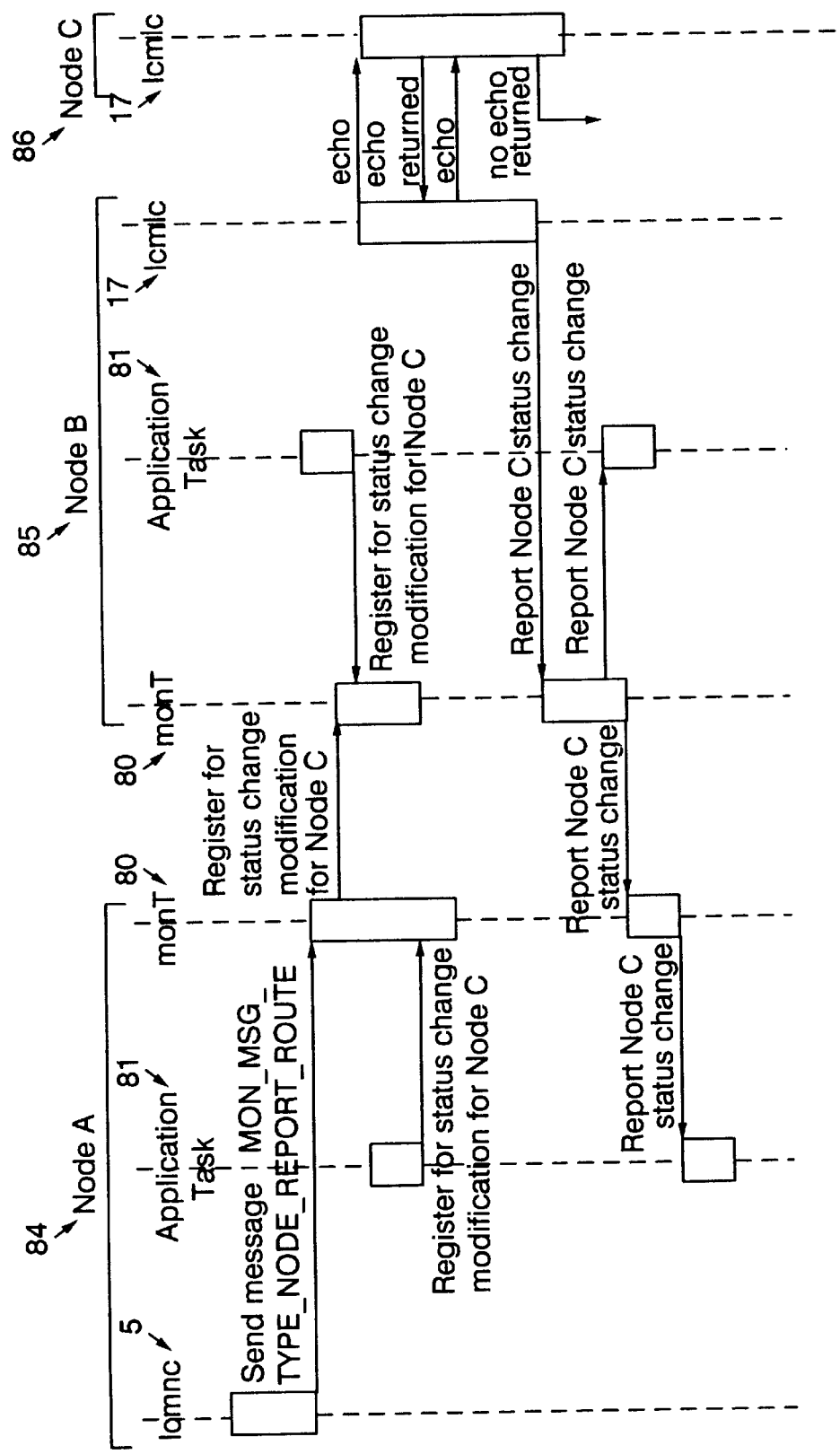
FIG. 10 depicts Communication Link Status Change Notification (a typical sequence of messages that occur when application tasks register with the monT task to be notified of communication link alarms for directly connected nodes and remote nodes. Note that all messages actually pass through lcmnc en route to their destination)

FIG. 10 depicts a typical sequence of messages that occur when application tasks register with the monT task to be notified of communication link alarms for directly connected nodes and remote nodes. Note that all messages actually pass through lcmnc en route to their destination.

In the time sequence shown node A 84 is directly connected to node B 85 and node B is directly connected to node C 86. Node A is not directly connected to node C, but the node A's communication configuration specifies that node C can be reached by using node B as a routing node. All three nodes are IP network Tasktalk nodes.

lcmnc 5 on node A sends a list of all directly connected and routed nodes to the monT on node A using the MON_MSG_TYPE_NODE_REPORT_ROUTE message.

The node A monT 80 registers with the node B monT 80 for communications link status change notification for all nodes that node B routes for node A, including node C.

An application task 81 on node B registers for communications link status change notification for node C.

An application task on node A 84 registers for communications link status change notification for node C 86.

The node B lcmlc tasks send echo messages to the node C lcmlc task, which returns the echo message, confirming the integrity of the communication link.

When node B lcmlc does not receive a reply to the echo message sent to the node C lcmlc, the communications link status is considered to be in alarm and the communications link status change is reported to the node B monT.

The node B 85 monT reports the communications link status change for node C 86 to the node B application task 81.

The node B monT reports the communications link status change for node C to the node A monT.

The node A monT reports the communications link status change for node C to the node A application task.

Note that this registration and forwarding mechanism for communication link status changes can be extended to an arbitrary number of hops (number of hops is 2 from node A to node C in this example), and also is used to propagate communication link status through the Tasktalk network for LAPB and Bisync 3270 nodes.

5.2.4 Start Up

Figure 11A:
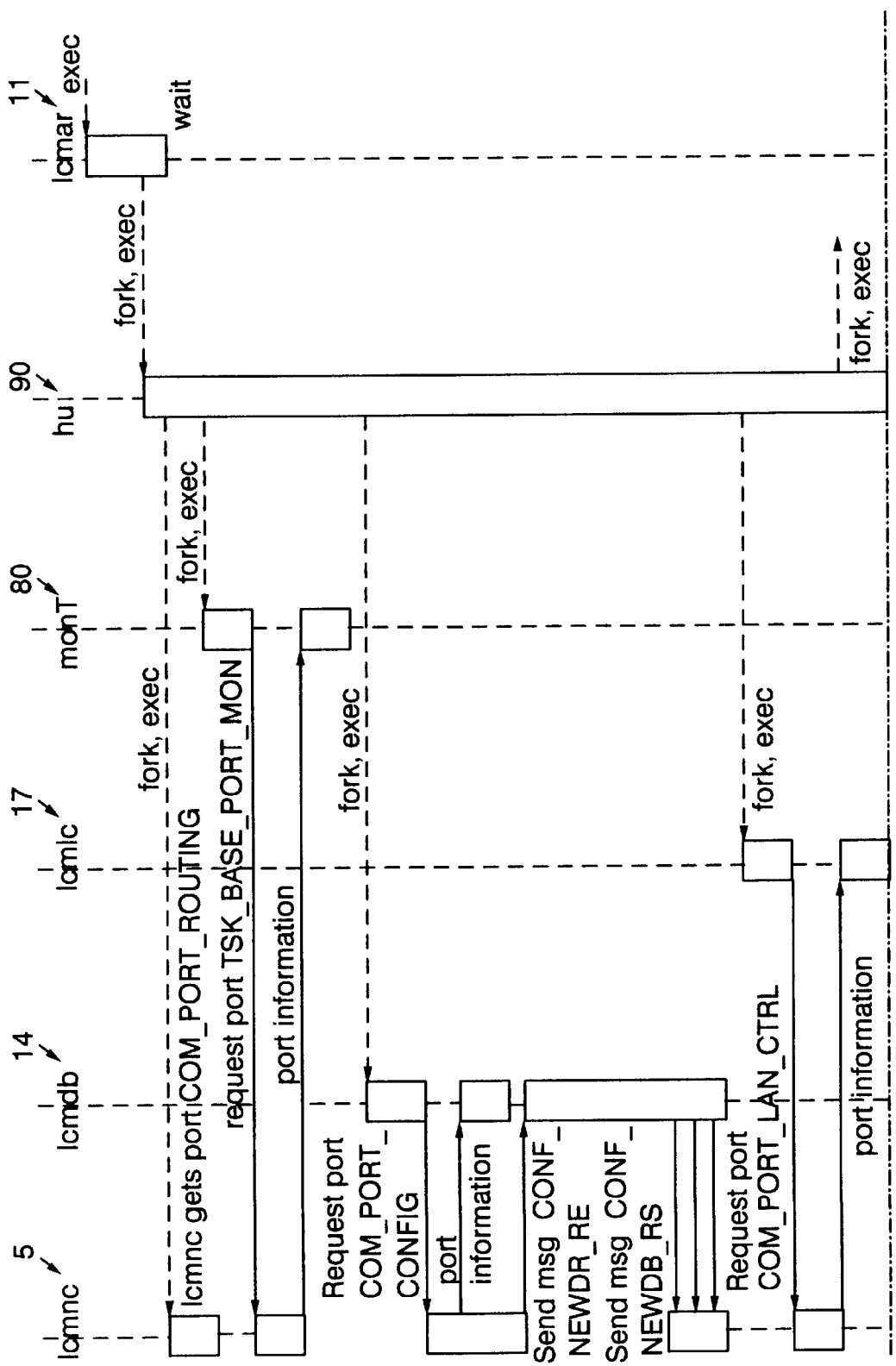
FIG. 11 depicts a sequence of messages sent between communication tasks during node startup.
Figures 11, 11A, 11B:
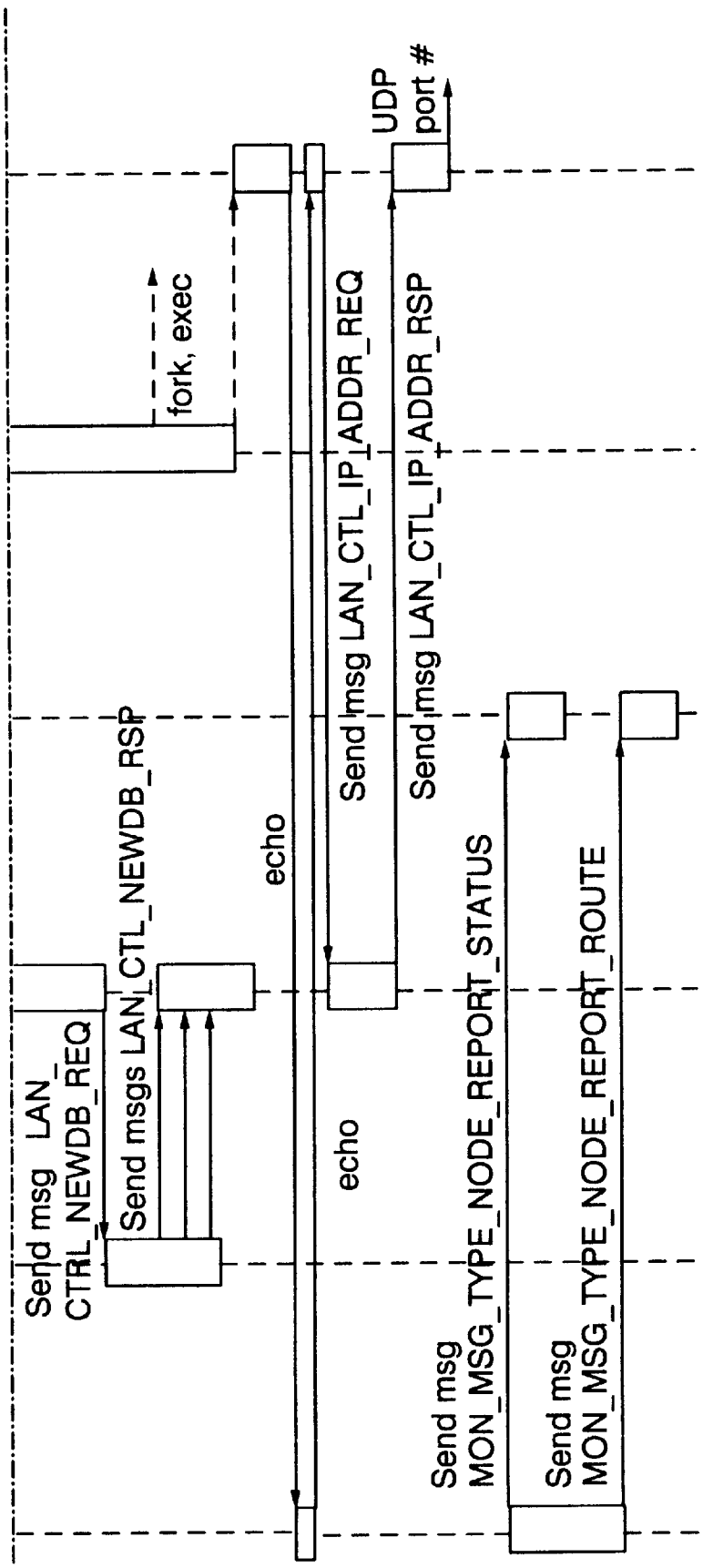

Referring to FIG. 11 is a typical sequence of messages sent between the communications tasks during node startup. Note that all messages actually pass through lcmnc en a route to their destination.

- lcmar 11 is exec'ed by inaas.d to find a node'sUDP port address (and start it up if necessary). In this case the node is not up yet solcmar must start it.
- lcmar 11 uses the systems command to start up the shell script hu 90.
- hu 90 parses the tasklist and starts up the communications tasks one after another (the order is lcmnc 5, monT 80, lcmdb 14, lcmlc 17, other message delivery tasks, application tasks). This continues as messages are sent around by the started tasks.
- lcmnc 5 is started by hu 90 and initializes the shared memory segment that other tasks use to request ports and to monitor the status of their ports. It also configures its own port COM_PORT_ROUTING.
- monT 80 is started by hu 90 and gets a port from lcmnc 5.
- lcmdb 14 is started by hu and gets a port from lcmnc 5.
- lcmnc 5 realizes lcmdb 14 is up and sends it a request for a database download.
- lcmdb 14 downloads the required information in a number of messages to lcmnc.
- lcmlc 17 is started by hu and gets a port from lcnmc
- lcmlc 17 sends a database request to lcmdb 14.
- lcmdb 17 downloads the required information to lcmlc. At this point, all the 1cm tasks know what the network looks like.
- hu 90 starts other tasks from the tasklist then exits triggering lcmar to continue processing.
- lcmar 11 verifies that a message sent to the echo port returns to it.
- lcmar 11 sends a request to lcmlc for all the active UDP port numbers.
- lcmlc 17 sends the list to lcmar, which decides which is the appropriate port number to write down a socket to the application access client. It uses the parameters of the socket to decide which port to write.
- lcmlc 17 sends lists of all the directly connected and routed nodes to monT 80.

5.2.5 Application Access

Referring to FIG. 12 shown is a typical sequence of events that occur when an application is accessed using the Applications Access component above. For the purpose of this illustration, the client will be the lcmlc address hunter for which the appropriate access agent is lcmar 11 to be run on the node for which the UDP address is needed.

The two tasks (lcmlc 17 and hunter 10) at the left of the diagram are running on a different node (and often a different host) than the two (lcmlc 17 and lcmar 11) tasks shown at the right. inaas.d 6a and child inaas.d 55 are tasks running as root on the same host as the node on the right.

- the hunter 10 (acting as an application access client) initiates a socket connection to the inaas.d daemon on the host on which the application (usually a wave node) resides.
- the inaas.d 6a accepts this connection and forks a child to handle the upcoming request.
- information identifying the request is exchanged over the socket between the hunter 10 and the child of inaas.d 55.
- child inaas.d validates the request by comparing it with data in inaas.conf (see Configuration File lcmdb.conf in s. 4.1.1), and exec's the appropriate access agent task (in this case lcmar running as the node's user).
- the hunter 10 writes a request for UDP port information down the socket which is now connected to lcmar.
- lcmar 67 checks that the node is up (see the event sequence Start Up in s.5.2.4), then sends a request for this information to lcmlc.
- lcmlc 17 sends the list of all active UDP ports (one for each network interface) back to lcmar.
- lcmar 67 uses parameters of its socket connection to the hunter to decide with UDP port's information should be written down the socket to the hunter.
- the hunter 10 forwards the newly acquired address information to it's parent lcmlc which will make it possible for it to talk to the remote node's lcmlc.

5.2.6 Two nodes establishing communications over IP

Referring to FIG. 13 is a typical sequence of messages sent between tasks on two different nodes as they establish communications over IP.

Note that for purposes of clarity, the three tasks on the left will be referred to as residing on node A, while those on the right will reside on node B. Also note the messages from a hunter to its lcmlc actually pass through lcmnc (not shown for simplicity).

- lcmlc 17 on both nodes fork children that hunt for other node's addresses. These "hunter"s make calls to Application Access functionality.
- Node A hunter 10 finds node B (see the event sequence entitled FIG. 5-2-5 Application Access for more details) address and forwards details to lcmlc 17.
- lcmlc 17 sends echo message to COM_PORT_ECHO on the node B. If it returns node will be made up and monT notified.
- node B lcmlc receives message, notes it does not have the address for the originating node (A), and tells its hunter to look for that node right away.
- lcmlc 17 then forwards echo to lcmnc (where COM_PORT_ECHO logically exists).
- lcmnc 5 switches destination and source addresses and returns echo to lcmlc.
- lcmlc 17 cannot send message back to original node (A) cause: does not have its address, message discarded.
- Node B hunter finds node A address, notifies lcmlc.
- echo message is sent for Node B lcmlc, passing through A lcmlc, A lcmnc, A lcmlc before returning. On return lcmlc on node B notifies its monT that node A is up.
- Meanwhile, node A lcmlc retries sending echo to node B which now succeeds, and node A marks node B as up and notifies monT.

5.2.7 Testing Communications Between Two Nodes

Figure 14:
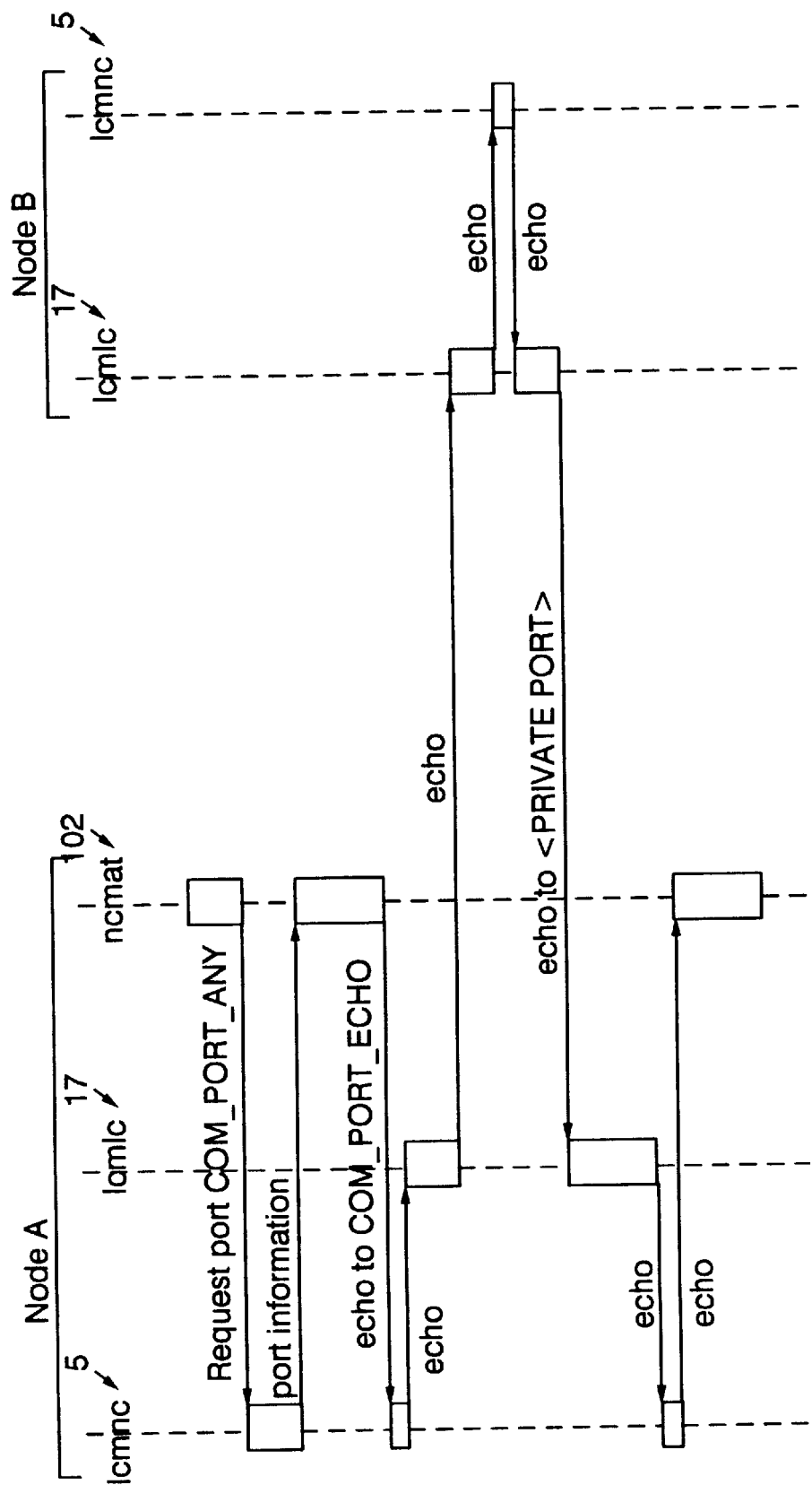
FIG. 14 depicts a testing communications between two nodes (a typical sequence of messages that could be sent when ncmat is run to test communications to a remote node).

Referring to FIG. 14 is a typical sequence of messages that could be sent when ncmat 102 is run to test communications to a remote node.

- ncmat 102 obtains its private port from lcmnc.
- ncmat sends echo message to COM_PORT_ECHO on the remote node B.
- this message is forwarded by lcmnc to lcmlc to the remote lcmlc on node B to the remote lcmnc.

remote lcmlc swaps the source and destination addresses and sends the message back. It is passed through remote lcmlc, lcmlc and lcmnc before returning to ncmat 102.

While the above is a complete description of the preferred embodiment of the present invention it will be well known in the art that it is possible to use various alternatives, modifications, and equivalents. Therefore, the scope of the present invention should be determined with reference to the claims with their full scope of equivalents.

What is claimed is:

1. Network communication services system for providing communication services between nodes of a network comprising:
   a plurality of nodes;
   said nodes comprising:
   local communications access means for each node adapted to forward a message from a task on a node internally to another task on said node;
   one or more internode message delivery task means on a first node adapted to forward a message addressed to a second node from said local communications access means on said first node to said second node to internode message delivery task means on said second node and to accept messages from an internode message delivery task means of a remote node for routing as appropriate to:
   (i) local communications access means if intended for internal use within a node
   (ii) internode message delivery task means of said remote node
   monitoring means for monitoring communications link between nodes including:
   said internode message delivery task means including status monitoring task means for communications connection to other nodes:
   said status monitoring task means including polling task means for polling said other nodes to determine their status: and reporting means for reporting a detected change in status of said other nodes;
   said status monitoring task means being adapted to:
   store status information in a database:
   for registration of tasks
   notify tasks registered with it of changes in communication link status of selected nodes.

2. The system of claim 1 including task manager means (TMGT) at a node adapted to monitor applications within said node and including:
   means to start a task on said node;
   means to monitor said task;
   means to restart said task if required;
   means to terminate said task;
   means to report changes of status of said node to said monitoring means.

3. The system of claim 1 wherein said monitoring means (monT) includes:
   means for answering queries from other tasks for node status of a remote node;
   means for notifying tasks asynchronously of node status;
   means for registering with monitoring means on a node that is directly connected to another node that provides communications routing for said other node, in order to determine communication link status of a node that it has a route to and also to any node to which it is directly connected.

4. Network communication services system for providing communication services for both message delivery and Remote Procedure Call services between nodes of networks operating with different communication Protocols to provide a virtual video conferencing network comprising:
   a plurality of nodes;
   said nodes comprising:
   local communications access means for each node adapted to forward a message from a task on a node internally to another task on said node;
   configuration information means containing information on nodes on different networks with different communication protocols with which communication is possible;
   one or more internode message delivery task means on a first node adapted to forward a message addressed to second node from said local communications access means on said first node to said second node to internode message delivery task means on said second node and to accept messages from an internode message delivery task means of a remote node on a network operating using a different communication protocol than the network of the first node for routing as appropriate to:
   (i) local communications access means if intended for internal use within a node
   (ii) internode message delivery task means of said remote node; wherein said internode message delivery task means on at least said first node is adapted to communicate in a plurality of data communication protocols including at least one of: IP (Internet Protocol), LAPB, or Bisync 3270
   video communication apparatus at said network for video communication on the virtual video conferencing network.

5. Network communication services system for providing communication services between nodes of a video conferencing network comprising:
   a plurality of nodes, each said node comprising:
   local task communications access means for each node adapted to forward a message from a task on a node internally to another task on said node;
   configuration information means containing information on nodes with which telecommunication on the video conferencing network is possible;
   one or more internode message delivery task means on a first node adapted to forward a message addressed to second node from said local communications access means on said first node to said second node to internode message delivery task means on said second node and to accept messages from an internode message delivery task means of a remote node for routing as appropriate to:
   (i) local communications access means if intended for internal use within a node
   (ii) internode message delivery task means of said remote node
   a video communication apparatus at said nodes for video communication on the video conferencing network.

6. The system of claim 5 further comprising: monitoring means for monitoring communications link between nodes including:
   said internode message delivery task means including status monitoring task means for communications connection to other nodes;

said status monitoring task means including polling task means for polling said other nodes to determine their status; and reporting means for reporting a detected change in status of said other nodes;

said status monitoring task means being adapted to:

store status information in a database;

for registration of tasks;

notify tasks registered with it of changes in communication link status of selected nodes.

7. The system of claim 6 wherein said monitoring means (monT) includes:

means for answering queries from other tasks for node status of a remote node;

means for notifying tasks asynchronously of node status;

means for registering with monitoring means on a node that is directly connected to another node that provides communications routing for said other node, in order to determine communication link status of a node that it has a route to and also to any node to which it is directly connected.

8. The system of claim 7 including task manager means (TMGT) at a node adapted to monitor applications within said node and including:

means to start a task on said node;

means to monitor said task;

means to restart said task if required;

means to terminate said task;

means to report changes of status of said node to said monitoring means.

9. A method for use in a network communication services system for providing communication services between nodes of said network comprising:

for said nodes;

forwarding a message from a task on a node internally to another task on said node using local communications access means on each node;

storing information on nodes with which communication is possible within configuration information means within said nodes;

forwarding a message using one or more internode message delivery task means on a first node to forward a message addressed to a second node from said local communications access means on said first node to said second node to internode message delivery task means to accept messages from an internode message delivery task means of a remote node for routing as appropriate to:

(i) local communications access means if intended to internal use with a node (ii) internode message delivery task means of said remote node monitoring communications link between nodes using monitoring means wherein said monitoring includes:

monitoring status of nodes with which communications connections are required using status monitoring task means for communications connection to other nodes:

polling said other nodes using polling task means for polling said other nodes to determine their status; and reporting a detected change in status of said other nodes using reporting means;

said status monitoring task means being adapted to:

store status information in a database;

register of tasks;

notify tasks registered with it of chances in communication link status of selected nodes.

10. The method of claim 9 wherein said monitoring includes:

answering queries from other tasks for node status of a remote node;

notifying tasks asynchronously of node status;

registering with monitoring means on a node that is directly connected to another node that providing communications routing for said other node, in order to determine communication link status of a node that it has a route to and also to any node to which it is directly connected.

11. The method of claim 10 including monitoring applications within said node and including the capability of:

starting a task on said node;

monitoring said task;

restarting said task if required;

terminating said task if required;

reporting changes of status of said node in monitoring.

12. A computer program product comprising:

a computer usable medium having computer readable program code means embodied therein for implementing a network communication services system for providing communication services between nodes of a network comprising a plurality of nodes;

the computer readable program code means in said computer program product comprising: computer readable program code means for causing a computer to effect, local communications access means for each node adapted to forward a message from a task on a node internally to another task on said node;

computer readable program code means for causing a computer to effect, configuration information means containing information on nodes with which communication is possible;

computer readable program means for causing a computer to effect, one or more internode message delivery task means on a first node adapted to forward a message addressed to a second node from said local communications access means on said first node to said second node to internode message delivery task means on said second node and to accept messages from an internode message delivery task means of a remote node to routing as appropriate to:

(i) local communications access means if intended for internal use within a node (ii) internode message delivery task means of said remote node computer readable program code means for causing a computer to effect, monitoring means for monitoring communications link between nodes including:

said internode message delivery task means including status monitoring task means for communications connection to other nodes; said status monitoring task means including polling task means for polling said other nodes to determine their status; and reporting means for reporting a detected change in status of said other nodes;

said status monitoring task means being adapted to:

store status information in a database;

for registration of tasks notify tasks registered with it of changes in communication link status of selected nodes.

13. The computer program product of claim 12 wherein said computer readable program code means for causing a computer to effect monitoring means (monT) includes:
- means for answering queries from other tasks for node status of a remote node;
- means for notifying tasks asynchronously of node status;
- means for registering with monitoring means on a node that is directly connected to another node that provides communications routing for said other node, in order to determine communication link status of a node that it has a route to and also to any node to which it is directly connected.

14. The computer program product of claim 12 including computer readable program code means for causing a computer to effect, task manager means (TMGT) at a node adapted to monitor applications within said node and including computer readable program code means for causing a computer to effect:
- means to start a task on said node;
- means to monitor said task;
- means to restart said task if required;
- means to terminate said task;
- means to report changes of status of said node to said monitoring means.

15. A program storage device readable by a machine, tangibly embodying a program of instructions executable by the machine to perform method steps for use in a network communication services system for providing communication services between nodes of said network comprising:
- for said nodes;
- the method steps of:
- forwarding a message from a task on a node internally to another task on said node using local communications access means on each node;
- storing information on nodes with which communication is possible within configuration information means within said nodes;
- forwarding a message using one or more internode message delivery task means on a first node to forward a message addressed to a second node from said local communications access means on said first node to said second node to internode message delivery task means on said second node and using internode message delivery task means to accept messages from an internode message delivery task means of a remote node for routing as appropriate to:
  (i) local communications access means if intended for internal use within a node
  (ii) internode message delivery task means of said remote node
- a program of instructions to perform the method steps of:
- monitoring communications link between nodes using monitoring means wherein said monitoring includes:
- monitoring status of nodes with which communications connections are required using status monitoring task means for communications connection to other nodes;
- polling said other nodes using polling task means for polling said other nodes to determine their status: and reporting a detected change in status of said other nodes using reporting means:
- said status monitoring task means being adapted to:
- store status information in a database;
- register of tasks;
- notify tasks registered with it of changes in communication link status of selected nodes.

16. The program storage device of claim 15 further comprising a program of instructions to perform the method steps of monitoring including:
- answering queries from other tasks for node status of a remote node;
- notifying tasks asynchronously of node status;
- registering with monitoring means on a node that is directly connected to another node that providing communications routing for said other node, in order to determine communication link status of a node that it has a route to and also to any node to which it is directly connected.

17. The program storage device of claim 16 further comprising a program of instructions to perform the method steps of monitoring applications within said node and including the capability of:
- starting a task on said node;
- monitoring said task;
- restarting said task if required;
- terminating said task if required;
- reporting changes of status of said node in monitoring.

18. A computer program product comprising:
- a computer usable medium having computer readable program code embodied therein for implementing a virtual network communication services system providing video conferencing communication services between nodes of a network comprising a plurality of nodes arranged on different networks operating using different communication protocols,
- the computer readable program code in said computer program product comprising:
- computer readable program code for causing a computer to effect a local communications access mechanism for each node adapted to forward a message from a task on a node internally to another task on said node;
- computer readable program code for causing a computer to provide, configuration information on nodes with which communication is possible;
- computer readable program code for causing a computer to effect, one or more internode message delivery task mechanisms on a first node adapted to forward a message addressed to a second node from said local communications access means on said first node to internode message delivery task mechanism on said second node and to accept messages from an internode message delivery task means of a remote node on a different network operating using a different communication protocol to routing as appropriate to:
  (i) a local communications access mechanism if intended for internal use within a node
  (ii) an internode message delivery task mechanism of said remote node.

19. The computer program product of claim 18 further comprising: computer readable program code means for causing a computer to effect, monitoring means for monitoring communications link between nodes including:
- said internode message delivery task means including status monitoring task means for communications connection to other nodes; said status monitoring task means including polling task means for polling said other nodes to determine their status; and reporting means for reporting a detected change in status of said other nodes;

said status monitoring task means being adapted to:
store status information in a database;
for registration of tasks
notify tasks registered with it of changes in communication link status of selected nodes.

20. The computer program product of claim 19 wherein said computer readable program code means for causing a computer to effect monitoring means (monT) includes:
means for answering queries from other tasks for node status of a remote node;
means for notifying tasks asynchronously of node status;
means for registering with monitoring means on a node that is directly connected to another node that provides communications routing for said other node, in order to determine communication link status of a node that it has a route to and also to any node to which it is directly connected.

21. The computer program product of claim 20 including computer readable program code means for causing a computer to effect, task manager means (TMGT) at a node adapted to monitor applications within said node and including computer readable program code means for causing a computer to effect:
means to start a task on said node;
means to monitor said task;
means to restart said task if required;
means to terminate said task;
means to report changes of status of said node to said monitoring means.

* * * * *